United States Patent
Malters et al.

(10) Patent No.: US 12,530,524 B1
(45) Date of Patent: Jan. 20, 2026

(54) ENRICHING DATASET METADATA WITH BUSINESS SEMANTICS FOR NATURAL LANGUAGE ANSWERING

(71) Applicant: Amazon Technologies, Inc., Seattle, WA (US)

(72) Inventors: Joshua Noah Malters, Seattle, WA (US); Joseph Robert Lilien, Succasunna, NJ (US); Stephen Michael Ash, Seattle, WA (US); Jiayong Hu, Seattle, WA (US); Jiajun Cao, Issaquah, WA (US); Aravind Kalakuntla, Bellevue, WA (US); Deepak Shantha Murthy, Waxhaw, NC (US); Ravindra Sudhindra, Bettendorf, IA (US); Rajesh Patel, Austin, TX (US); Patrick Ng, Rego Park, NY (US); Zhiguo Wang, Syosset, NY (US); Gregory David Adams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 18/070,117

(22) Filed: Nov. 28, 2022

(51) Int. Cl.
G06F 40/247 (2020.01)
G06F 40/295 (2020.01)
G06F 40/35 (2020.01)

(52) U.S. Cl.
CPC .......... *G06F 40/247* (2020.01); *G06F 40/295* (2020.01); *G06F 40/35* (2020.01)

(58) Field of Classification Search
CPC ....... G06F 40/247; G06F 40/295; G06F 40/35
See application file for complete search history.

(56) References Cited

U.S. PATENT DOCUMENTS

| | | | |
|---|---|---|---|
| 9,159,034 B2 | 10/2015 | Pinckney et al. | |
| 12,001,467 B1 * | 6/2024 | U | G06F 16/35 |
| 12,223,080 B1 | 2/2025 | Al-Rikabi et al. | |
| 2008/0189655 A1 | 8/2008 | Kol et al. | |

(Continued)

FOREIGN PATENT DOCUMENTS

WO WO 2021222396 A1 11/2021

OTHER PUBLICATIONS

Office Action for U.S. Appl. No. 18/070,170,Dated Oct. 30, 2024,Ash, "Synthetic Question Generation for Use With Natural Language Question Searching," 30 pages.

(Continued)

*Primary Examiner* — Richa Sonifrank
*Assistant Examiner* — Nathan Tengbumroong
(74) *Attorney, Agent, or Firm* — Knobbe, Martens, Olson & Bear, LLP

(57) ABSTRACT

This disclosure describes techniques and architecture for enriching dataset metadata of datasets arranged in tabular form comprising rows and columns, wherein each column has a name. The dataset metadata is enriched with business semantics for natural language question answering. The techniques include one or more of generating one or more synonyms for each name; ranking the names with respect to a likelihood that a column includes possible data to be returned to a user in response to a received NLQ from the user; predicting a date granularity for each column; and predicting a semantic type to describe values in the columns.

19 Claims, 19 Drawing Sheets

(56) References Cited

U.S. PATENT DOCUMENTS

| | | | |
|---|---|---|---|
| 2014/0101154 A1 | 4/2014 | Nagulakonda et al. | |
| 2015/0269176 A1 | 9/2015 | Marantz et al. | |
| 2015/0339590 A1 | 11/2015 | Maarek et al. | |
| 2019/0272296 A1* | 9/2019 | Prakash | G06F 16/243 |
| 2020/0012892 A1 | 1/2020 | Goodsitt et al. | |
| 2021/0019309 A1* | 1/2021 | Yadav | G06F 16/2428 |
| 2021/0374123 A1* | 12/2021 | Nicol | G06F 11/3447 |
| 2022/0035943 A1 | 2/2022 | Jones | |
| 2022/0067281 A1* | 3/2022 | Hu | G06F 40/30 |
| 2022/0342583 A1* | 10/2022 | Scott | G06F 40/30 |
| 2023/0070715 A1* | 3/2023 | Pajak | G06N 3/09 |
| 2023/0394031 A1* | 12/2023 | Kothari | G06F 16/2365 |
| 2023/0418873 A1* | 12/2023 | Gao | G06N 20/00 |

OTHER PUBLICATIONS

Hulsebos, Madelon, et al. "Sherlock: A deep learning approach to semantic data type detection." (Semantic typing as supervised learning) KDD '19: Proceedings of the 25th ACM SIGKDD International Conference on Knowledge Discovery & Data Mining, 2019, pp. 1500-1508, Association for Computing Machinery, New York, NY, US.

Zhang, Dan, et al. "Sato: Contextual Semantic Type Detection in Tables." (Follow-up paper to Sherlock) Proceeding of the VLDB Endowment, vol. 13, Issue 12, pp. 1835-1848, 2020, VLDB Endowment.

Fernandez, Raul Castro, et al. "Seeping semantics: Linking datasets using word embeddings for data discovery." IEEE 34th International Conference on Data Engineering (ICDE) 2018, pp. 989-1000, Article 8509314.

Suhara, Yoshihiko, et al, "Annotating Columns with Pre-trained Language Models" SIGMOD '22: Proceeding of the 2022 International Conference on Management of Data, 2021, pp. 1493-1503.

Office Action for U.S. Appl. No. 18/070,117, mailed on Nov. 27, 2024, 20 pages.

* cited by examiner

ENRICHING DATASET METADATA WITH BUSINESS SEMANTICS FOR NATURAL LANGUAGE ANSWERING

BACKGROUND

Service provider networks may provide cloud based computing services that may include a cloud-scale business intelligence (BI) service. Such a cloud-scale BI service may be used to deliver easy to understand insights to members of various teams and groups no matter where the individuals of the teams and groups are located. Such cloud-scale BI services connect to business data in the cloud and may combine data from many different sources. In a single data dashboard, the BI service may include data from the cloud based computing service, third party data, big data, spreadsheet data, software as a service (SaaS) data, business-to-business (B2B) data, etc. The data within the cloud-scale BI service is generally in tabular form and may be searched and presented in various dashboard forms using key word searches. Currently, cloud-scale BI services do not adequately support natural language question (NLQ) requests.

The BI service may be used to allow BI analysts and engineers to collect data within their data warehouses and data silos across data links to produce data dashboards and reports to be presented to people without technical experience and/or understanding, e.g., business people. By allowing NLQs, such people may ask questions and curate how to view data. However, interpreting people's intentions based on what they type and translating that intent into what physical data is available despite the schemas can be difficult. Thus, for NLQs it is necessary to transfer semantics to understand the underlying data. This results in a semiautomated process of transferring arbitrary, disorganized, data schemas and the corresponding data into enough of a schematic representation of what is in the data so that people may access the data using NLQs. If the context around the NLQs is missing, then it is difficult to determine the domain that is needed to answer the NLQs since NLQs are often worded in a way that a non-technical person would understand. Thus, it is difficult to access the data with NLQs.

Additionally, there may be limits as to which people, groups, teams, etc., may access some of the data. Thus, when an NLQ is presented, an answer should not be provided to a person, group, or team that does not have access to the answer. For example, if a person types in "secret project" and the answer comes back with "secret project XYZ," then the person now knows secret project XYZ exists. If this person is not authorized to know the existence of secret project XYZ, then this is a problem. This can be an important aspect of BI services in that there are organizations that are providing services that may eventually embed an NLQ service feature within their BI service and then provide the BI service to multiple organizations. If a person at one organization types in an NLQ and an answer comes back related to a different organization, then a breach of privacy and security may result.

Furthermore, with the datasets, it can be difficult to know what to analyze and/or consider in the dataset in order to answer the NLQs. Interpreting a user's intent when analyzing an NLQ for obtaining an answer can be difficult. In order to answer the NLQ, it is desirable to provide both a quantitative and qualitative answer and not just a large amount of numbers.

Also, providing an NLQ search feature within a cloud scale BI service can also be difficult because users are generally comfortable with key word searching. Thus, it may be necessary to teach people how to obtain insights out of the data. With an NLQ, this can depend on a user's inference. Users may struggle how to form proper NLQs since the users, e.g., readers, typically are not familiar with what is contained within the data. Authors or administrators of the data generally are familiar with what is included in the data since authors and administrators are generally the ones who input and initially organize the data within the cloud scale BI service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
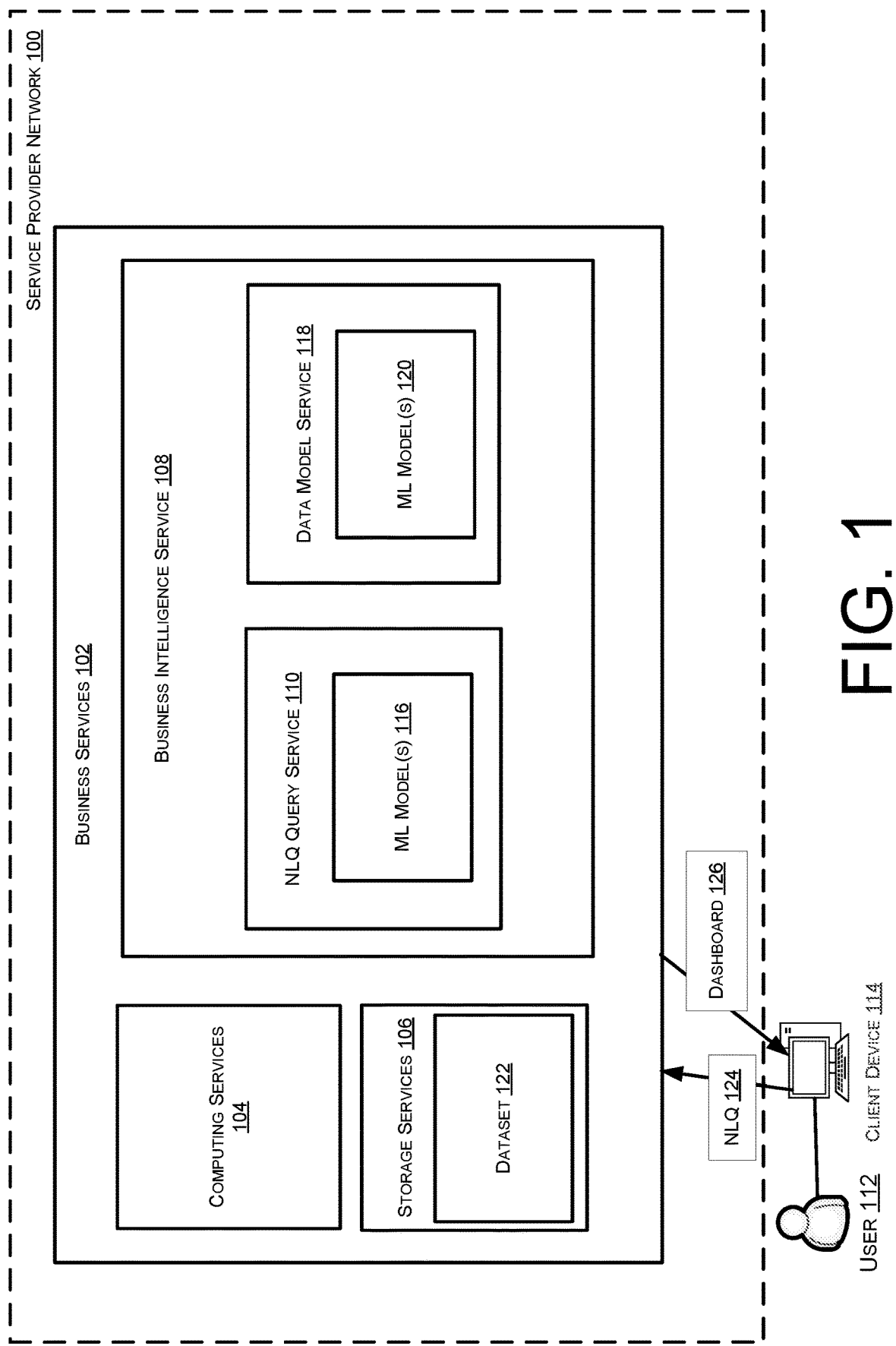
FIG. 1 schematically illustrates a system-architecture diagram of an example service provider network that includes a business intelligence service and an NLQ query service within the service provider network for verifying and validating documents associated with establishing a business account with the service provider network.

This disclosure describes, at least in part, techniques and architectures that enable datasets containing data in tabular form within business intelligence (BI) services to support natural language question (NLQ) search features or services. In particular, a BI service may enrich dataset metadata with business semantics in order to improve NLQ answering. The dataset metadata may be enriched utilizing one or more of column synonym generation, interesting field ranking on unseen schemas, column time granularity prediction, and semantic type inference.

For example, with column synonym generation, a knowledge graph (e.g., using ConceptNet) may be traversed for a target phrase, such as "Patient", to generate candidate synonyms. A domain specific phrase may be generated to generate a prompt for a large language model to fill in. For example, using "Patient" the phrase generated might be "In the context of healthcare, Patient is <candidate>". The hydrated phrase may be ranked via an ensemble of similarity models.

As another example, with interesting fields ranking on unseen schemas, a subset of fields is determined that are most important to use for NLQ submission and answering. Wide database schemas, denormalized columns, and data quality issues make question answering difficult and risks making adopting a question too difficult. In configurations, a Learn-To-Rank machine learning model may be used that takes an input schema and produces a total ranking/scores for how "interesting" each column of the dataset is.

As an example, with column time granularity prediction, in database schemas, date/time values are usually stored as timestamps, which most databases store as some version of time. However, in many BI scenarios, dates are used to represent points in time at different granularities. In configurations, multiple "neighborhoods" of unique dates are sampled from the data an attempt is made to try to fit those samples into one of the patterns of dates that occur on granularity boundaries (days, weeks, months, quarters, years) so that the period granularity to be used in downstream inference for NLQ submission and answering may be predicted and stored.

As another example, with semantic type inference, for each column in a dataset, schema information and sample values are used to predict a semantic type and subtype to describe the values in the column. These semantic types are used downstream for many parts of the inference pipeline. A list of semantic types with sub-types to characterize different kinds of common BI data that is particularly important for natural language questions and answers are used downstream. A set of heuristics, rules, and applied ML models (in particular for detecting person and organization types) are used.

The techniques and architecture may also provide row level security (RLS) for autocomplete during entry of NLQs and fuzzy matching in natural language question answering. For example, users of BI services often specify row level security rules to limit subsets of data to different end users, e.g., the users may limit parts of a dataset for certain end users by denying access to the end users based on rows within the dataset. These rules take the form of per-user predicates such as Steve can only see rows with region=US. An NLQ feature, however, needs fast auto-complete suggestions for cell values that come from rows that may be filtered by RLS rules. The NLQ also needs to do fuzzy matching against cell values that may be subject to RLS. This is difficult because Tim may be trying to autocomplete a value from a column that is not part of the RLS rule predicate, but the distinct eligible values that Tim is allowed to be shown are affected by the RLS rule predicates. For example, if project known as SecretProjectXYZ only occurs in rows with region=EU, then Tim should not see it as an autocomplete value or a fuzzy matching value since Steve is only allowed to see rows with region=US. Thus, in configurations, a complex extraction and preprocessing pipeline to extract distinct combinations of values against RLS predicate "rule keys" is used. Those distinct values are indexed along with grouped rule keys to enable pushing down predicates at auto-complete time. This enables pushing part of RLS rule handling to ingestion time of a dataset rather than handling all RLS rule handling at query time, enabling meeting of latency goals. In configurations, a single logical document of unique cell values is split into multiple documents with a subset of rule keys to handle scalability limits.

Additionally, the techniques and architecture may also provide automated contribution analysis for "why question" style NLQ answering, e.g., "why is revenue down in North America Q1 2022. In order to answer such questions, it is necessary to predict which factors are most likely to contribute to this change in metric so that various dimensions, e.g., columns of a dataset, of potential contribution can actually be analyzed to find insights. It is not possible to analyze every possible combination of columns to check for contribution, and thus it is necessary to apply multiple methods, some methods apriori at ingestion of the data and other methods at NLQ time in order to deliver an experience where someone can ask "why" about various metrics and get an answer in seconds. To answer "why" questions it is necessary to not only understand the intent of the user's question (what metric to analyze, what time period), but it is also necessary to automatically predict which factors to use. Thus, techniques described herein combine multiple signals together including, for example, frequency of use of combinations of dimensions in previous NLQs (warm-start), statistical information about columns (e.g., entropy), correlation/co-occurrence between pairs of dimension columns, and correlation between dimensions and dates. This information is used with a set of heuristics and rules to pick the best set of dimensions as contributing factors for a particular metric over a particular time period and present an automatic contribution analysis to the users to give them insights into their data.

Furthermore, the techniques and architecture may provide synthetic question generation for novel insights and teaching natural language question formulation and entry. The synthetic questions may also be provided as examples to a user to determine what exactly the user's intent representation (IR) is. For example, the synthetic questions may be presented to a user in a form of "did you mean _____?" The synthetic questions may also be presented to a user when the user has been asking related NLQs but has appeared to stop, e.g., hit a "dead end." The synthetic questions may be presented to the user as examples of further NLQs for entry in trying to obtain answers from the dataset related to the topic in which the user is interested, e.g., has been presenting NLQs.

In particular, a combination of composable templates and ML models may be used to generate natural, sensible synthetic questions about previously unseen data and schemas. These synthetic questions are used to teach users about possible questions to ask, show related questions to explore from previous answers, and provide suggestions for potential similar questions when a user cannot get the answer that they want. This is an important method to bridge the gap for new users, because natural language question answering on tabular data is a new modality compared to existing key word searching.

In configurations, synthetic question generation may be implemented on previously unseen schema using a three part process: composable, synthetic templates that generate combinations of potential questions using schema and data elements, an ML model that filters and scores the combinations based on how sensible the combinations are (as a perplexity score from the fine-tuned large language model), and finally an answerability filter that re-runs the question through an existing inference pipeline to make sure that in fact it is possible to generate the intended answer from that question text. The result is a set of working synthetic questions on unseen schemas that are relevant to their data and sensible. The application of the fine-tuned language model is important because just randomly generating questions from templates introduces many nonsensical questions that do not reflect column relationships and constraints informed by world knowledge. But the perplexity score from the large language model reflects some of this latent world knowledge where nonsensical combinations of columns as mentions in text become very surprising to the language model and result in a higher perplexity score for that question sentence.

As an improvement over randomly selecting columns from unseen schemas to generate questions, frequency information about fields and combinations of fields (e.g., sales by seller, sales by region, brand by profit etc.) from other BI artifacts (dashboards, reports) may be used to create a distribution to sample from when generating synthetic questions. Since synthetic question generation is targeting unseen schemas, it is desirable to leverage as many signals that can be from existing user effort, such as creating dashboards.

A valuable application of synthetic questions is to use dashboard metadata to automatically generate novel questions to suggest in order to provide other insights that are not covered by the existing dashboard. This extends to synthetic questions from just a teaching mechanism introducing users to NLQ to also be an ergonomic way to provide novel insights that build on top of existing traditional ways of consuming BI information (dashboards, reports). This method may start by generating synthetic question and answers using the same methods described previously. Then use the answer structure from visuals on the existing dashboard to filter and cluster generated synthetic questions to find similar, but different questions from what is already answered by the dashboard. To suggest insights, the generated, filtered, clustered questions may be ranked using an answer similarity score based on the frequency of "parts" of the answer occurring throughout existing dashboards and historical questions asked. This similarity method converts a specific answer intent representation (IR) into a "sketch" of the answer (replacing specific literals that are unlikely to be important with placeholders) and then creating hashes over all subtrees of the answer IR. These hashes act as terms in documents and standard term frequency-inverse document frequency (tf-idf) style scoring may be applied to co-occurring hashes from historical questions and existing dashboards. This similarity measure may be used to cluster and then within a cluster re-rank potentially interesting answers using a hand-curated complexity measure where different elements of the answer IR are given different weights based on how interesting that element often is. This allows for finding interesting similar questions that may provide interesting insights from what is already covered on the existing dashboard.

Thus, the techniques and architecture described herein provide a BI service that includes a NLQ feature or service within a service provider network. The BI service enriches dataset metadata with business semantics in order to improve NLQ answering. The dataset metadata may be enriched utilizing one or more of column synonym generation, interesting field ranking on unseen schemas, column time granularity prediction, and semantic type inference. The techniques and architecture also provide row level security for autocomplete during entry of NLQs and fuzzy matching in natural language question answering. The techniques and architecture additionally provide automated contribution analysis for "why question" style NLQ answering. Furthermore, the techniques and architecture provide synthetic question generation for novel insights and teaching natural language question formulation and entry. These various techniques and architecture allow for more accurate answering of NLQs, which can result in fewer errors when using NLQs to search datasets, thereby reducing processing time. The techniques and architecture also provide additional security, which can result in the use of less computing resources to correct errors.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes business services 102 that are provided by the service provider network 100. The business services 102 may be provided to businesses or individuals. In configurations, examples of the business services 102 provided to users include, but are not limited to, computing services 104 and storage services 106. In configurations, the business services 102 provided by the service provider network 100 include a business intelligence (BI) service 108. In configurations, the BI service 104 includes a natural language question (NLQ) query service 110. The NLQ query service may include one or more machine learning models 116. In configurations, the BI service 108 includes a data model service 118 that includes one or more ML models 120. As is known, other types of services are generally provided by the business services 102 of the service provider network 100.

In configurations, a user 112 accesses the service provider network 100 using a client device 114. The user 112 may thus obtain business services 102 from the service provider network 100 using the client device 114. In configurations, the user 112 may obtain services from the BI service 108. The services may include storing data as one or more datasets 122 in the storage services 106 in tabular form. Generally, the user 112 is an author that has control and authority of the one or more datasets 122 that are input and stored.

The one or more datasets 122 may be searched to glean information and insights with respect to the data within the one or more datasets 122. For example, information and insights may be gleaned, depending on the one or more datasets 122, regarding sales, labor, shipping, etc. The information may be with respect to various time periods, totals, etc. In configurations, the user 112 may search the one or more datasets 122 using the NLQ query service 110. In particular, BI service 108 may be used to deliver easy to understand insights to members (e.g., user 112) of various teams and groups of a business or other type of organization no matter where the individuals of the teams and groups are located. The BI service 108 may connect to business data in the storage services 106 and/or data that may be stored in a database (not shown) within the BI service 108. The BI service 108 may combine data from many different sources. In a single data dashboard 126 that may be viewed by the user 112 on the client device 114, the BI service 108 may include data from the computing services 104, storage services 106, third party data, big data, spreadsheet data, software as a service (SaaS) data, business-to-business (B2B) data, etc. The data within the BI service 108 is generally in tabular form and may be searched and presented in various dashboard forms that may be viewed by the user 112 on the client device 114.

The BI service 108 provides access to the data in the one or more datasets 122 and prepares the data for use in reporting. As previously noted, in configurations, the user 112 may search the one or more datasets 122 using the NLQ query service 110. Thus, the user 112 may input NLQs 124 via the client device 114 to the BI service 108 and the NLQ query service 110. NLQs 124 allow the user 112 to ask questions in a natural fashion similar to the way the user 112 might speak. An example of an NLQ 124 includes "Why did revenue drop in August 2022?" Another example includes "How many patients did Dr. Smith see in the past six months?" Thus, the user 112 may input questions to the NLQ query service 110 rather than just inputting keywords and hoping that a useful answer is provided.

In response to the NLQs 124, the BI service 108 performs searches the one or more datasets 122 for one or more possible answers. This can involve using one or more ML models 116 and/or 120 to analyze the NLQs 124. determining an intent representation (IR), as will be described further herein. In the end, the results may be presented or published as a dashboard 126 to share with the user 112 on the client device 114, as well as other people (users) on their client devices. In configurations, the user 112 may be an author or an administrator (admin) that has complete access and control over all of the data and the dashboard(s) 126. The user 112 may also be in the form of a reader that may read some or all of the data, e.g., query the data, but may not manipulate the data.

Figure 2:
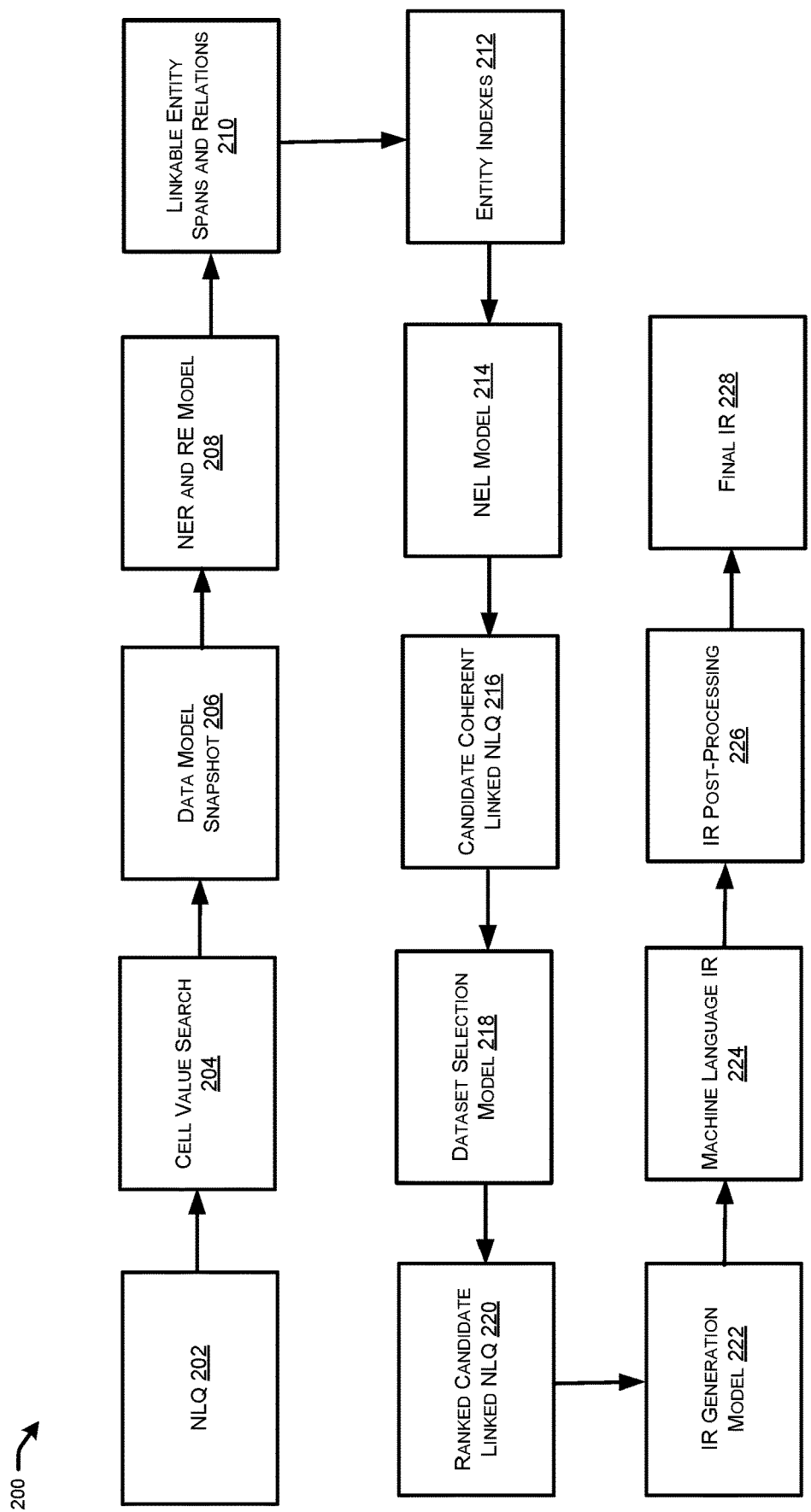
FIG. 2 schematically illustrates an example of some of the components of a model pipeline for a query execution process for NLQ processing within the NLQ query service of FIG. 1.

FIG. 2 schematically illustrates an example of some of the components of a model pipeline 200 for a query execution process for NLQ processing within the NLQ query service 110. The components include a NQL 202, a cell value search index 204, a data model snapshot 206, a named entity recognition (NER) and relation extraction (RE) model 208, linkable entity spans and relations 210, entity indexes 212, named entity linking (NEL) model 214, candidate coherent linked NLQ 216, dataset selection (DSS) model 218, ranked candidate linked NLQ 220, inference representation (IR) generation model 222, machine language (ML) IR 224, IR post-processing 226, and final (FE) IR 228.

For the NLQ 202, the NLQ query service (inference service) 110 receives a query request containing a simple NLQ String (e.g., "What is the revenue increase for XYZ WoW for the last 12 weeks") and optionally any previously customer-linked spans during auto-complete, query assistance. As the user 112 typed the NLQ, the user 112 might have selected options from query assistance hints, manually linking some of the possible NEL options. When the final query is submitted, the query contains the raw NLQ text along with any "tagged" (user-selected, linked) spans along with their resolved references (e.g. "XYZ"=col value from col prod_name in datasetId 1234). The NLQ 202 may be a structured NLQ or a free-form NLQ.

The cell value search index 204 is an index search over only cell values to get potential hits of cell values referenced in the query to help inform the NER model. The effective data model snapshot 206 is prepared by the NLQ query service 110 by pulling the relevant data dataset's metadata (columns, named entities, named filters, calculated fields, etc.) from the data model service 118 and packaging it up for downstream models. The data model snapshot and structured NLQ data is the input sent downstream to the query execution pipeline to generate IR. It is to be noted that this is the effective data model snapshot with only the included fields from the data topic. The data model service 118 actually captures a little more state to help reconcile the view of a dataset with the relevant metadata that can be used for question answering.

The NER model input 208 takes the NLQ text and determines spans in the text (identified by offsets in the text) along with possible high-level types. The NER model 208 outputs labels that describe the expected semantic role of an entity mentioned in the NLQ.

At the linkable entity spans and relations 210, the NER identifies spans of text that might refer to elements ("entities" in the NER sense) in the user's data, which is fuzzy searched in the computing service 104 to find the top-k link options for each. If the user 112 has used a query assistance interface to manually link particular entity spans, then it is not necessary to search for the entity spans.

At the entity indexes 212, the NLQ query service 110 generates the top-k candidate list of results for relevant detected entities by querying the computing services 104 and uses modified BM25 scoring to pick the top-k (today k=64) results per entity to pass downstream. Note that not all entity mentions in the NLQ have top-k candidate lists. Metric mentions (WoW, yearly change) do not link to metadata or schema elements.

When the structured NLQ data 202 reaches further downstream, it is updated to include the top-k entity candidates from the computing services 104 that are sent as the candidates for the NEL model 214. Note here that this same structured NLQ structure is used in both query assistance where the top-k candidate results are being sent back to the user 112 to possibly pick from.

The NEL model 214 inference endpoint evaluates the top-k NLQ query service 110 results, which may come from many different datasets. The NEL model 214 produces one candidate linked NLQ per potential dataset (i.e., 1 per distinct dataset across all entity link options) and, for each, picks the best link options for that dataset.

Each candidate coherent linked NLQ 216 is a coherent linkage against a single dataset. Since the NLQ query service 110 can only query a single dataset, all of the entity linkages must refer to columns within the picked dataset. Since the NEL model 214 and DSS model 218 might pick the wrong dataset, multiple output options are allowed to be considered throughout the model pipeline 200.

The DSS model 218 inference endpoint takes the candidate linked NLQs (which is 1 per dataset) and the data model snapshot and scores each based on how likely that dataset should answer this NLQ. The DSS model 218 outputs the same list 220 of candidate linked NLQs from NEL but appends a DSS score for each which represents how likely this dataset is to answer this NLQ.

The IR generation model 222 takes a top-k list of candidate linked NLQs and their dataset snapshots and returns the top-k list of generated IRs.

The ML IR 224 is produced by the IR generation model 222 and returned to the NLQ query service 110 for post-processing. The IR post-processing 226 receives the initial IR from the query execution pipeline and transforms it applying deterministic post-processing for advanced NLQ query service-specific handling, default filters, etc. The FE IR 228 is then routed to an engine within the NLQ query service 110, where the frontend JS code does the equivalent of dragging field to field wells of data and calling auto-graph. The JS code renders the visual using the resulting data and the results of auto-graph, the customer data source (or a calculation engine within the NLQ query service 110), and drawing APIs to render the visual in response to the user's NLQ. The visual may now be displayed to the user 112.

Table 1 below illustrates an example of tabular data within a dataset 122.

TABLE 1

| Customer Name | Account ID | Territory | Vertical | Date | Account Manager | Revenue |
|---|---|---|---|---|---|---|
| ABC | 123 | US-SW | Tech | Jan. 1, 2021 | John Doe | $1,000 |
| QRS | 234 | US-SW | Tech | Jan. 1, 2021 | Jake Dun | $2,000 |
| YYZ | 345 | US-NE | Finserv | Feb. 1, 2021 | MJ | $3,000 |
| ABC | 222 | US-NW | Tech | Jan. 1, 2021 | James Finch | $4,000 |
| ABC | 333 | US-NE | Finserv | Jan. 1, 2021 | MJ | $2,000 |
| ABC | 444 | US-NW | Finserv | Jan. 1, 2021 | MJ | $3,000 |
| ABC | 555 | US-SW | Tech | Jan. 1, 2021 | MJ | $3,000 |

As previously noted, users of BI service 108 often specify row level security rules to limit subsets of data to different end users (e.g., user 112). For example, a user of BI service 108 may limit parts of a dataset 122 for certain end users, e.g., user 112, by denying access to the end user 112 based on rows within the dataset 122. These rules take the form of per-user predicates such as user 112 can only see rows with region=US-NE. When the user 112 is entering an NLQ, an NLQ feature needs fast auto-complete suggestions for cell values that come from rows that may be filtered by row level security (RLS) rules. The NLQ also needs to do fuzzy matching against cell values that may be subject to RLS. This is difficult because user 112 may be trying to autocomplete a value from a column that is not part of the RLS rule predicate, but who's distinct eligible values to show to user 112 is affected by the rule predicates. Thus, user 112 should not see values for US-SW as an autocomplete value or a fuzzy matching value since user 112 is only allowed to see rows with region=US-NE. Accordingly, user 112 should not be able to see the cell value of Table 1 where the row is US-SW and the vertical is "Tech." Thus, in configurations a complex extraction and preprocessing pipeline to extract distinct combinations of values against RLS predicate "rule keys" is used. Those distinct values are indexed along with grouped rule keys to enable pushing down predicates at auto-complete time. This enables pushing part of RLS rule handling to ingestion time of a dataset 122 rather than handling all RLS rule at query time, thereby enabling meeting of latency goals. In configurations, a single logical document of unique cell values is split into multiple documents with a subset of rule keys to handle scalability limits.

In configurations, the dataset illustrated in Table 1 is transformed into an example RLS rule key dataset with respect to customer ABC as shown in Table 2 below. The transformation may be performed by the data model service 118 using a machine learning (ML) model 120.

TABLE 2

| Group_Name | Territory | Vertical |
|---|---|---|
| US-SW-Tech | US-SW | Tech |
| US-NE-Fin | US-NE | Finserv |
| US-NE | US-NE | |
| US | US-SW, US-NE | |
| xyz | US-SW | Finserv |
| Admin | | |

For the example RLS rule key dataset in Table 2, the users in group US-SW-Tech can only see rows with Territory=US-SW and Vertical=Tech. Users in group US-NE-Fin can only see rows with Territory=US-NE and Vertical=Finserv. Users in group US-NE can only see rows with Territory=US-NE (but can see any Vertical within Territory US-NE). Users in group US can only see rows with Territory=US-SW or Territory=US-NE regardless of the "vertical" column. Users in group Admin can see all rows. Note that groups such as US and US-NE may be created with a blank (or null) for the "Vertical" column (and other columns) to allow for flexibility such as, for example, adding new users (readers) for accessing the dataset. Thus, the blank (or null) provides for "all values" in the "Vertical" column.

The example RLS rule key dataset in Table 2 is transformed into an index by extracting the combination of distinct cell values for customer name group by Territory and Vertical as illustrated in Table 3 below. The transformation may be performed by the data model service 118 using a machine learning (ML) model 120.

TABLE 3

| Customer_Name | Territory | Vertical |
|---|---|---|
| ABC | US-NE | Finserv |
| ABC | US-NW | Finserv |
| ABC | US-NW | Tech |
| ABC | US-SW | Tech |
| QRS | US-SW | Tech |
| YYZ | US-NE | Finserv |

Figure 3:
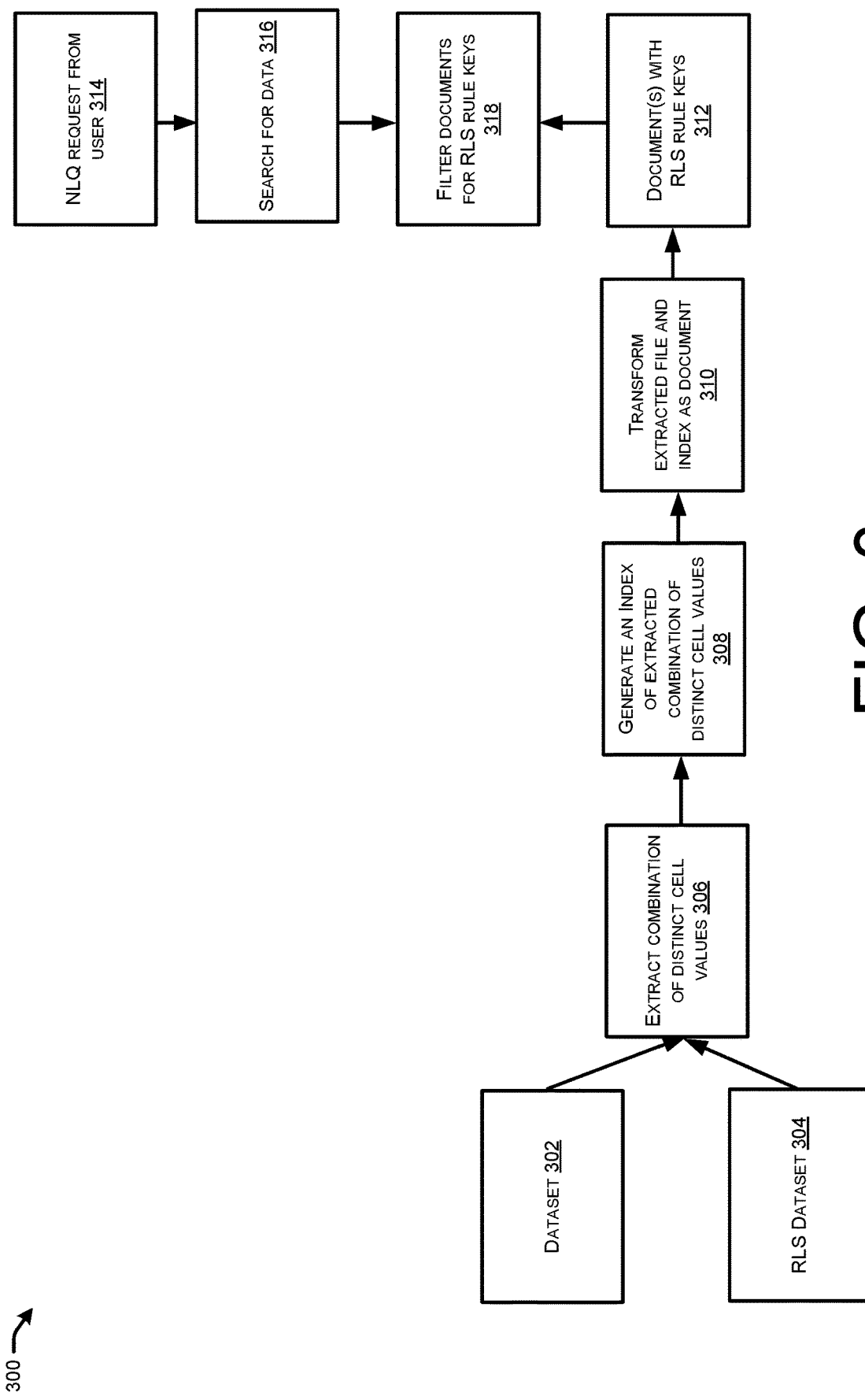
FIG. 3 schematically illustrates an example flow for creating and retrieving row level security (RLS) rule keys.

FIG. 3 schematically illustrates an example flow 300 for creating and retrieving RLS rule keys. For the flow illustrated in FIG. 3, a dataset 302, e.g., the dataset illustrated in Table 1, is provided. A RLS rule key dataset 304, e.g., the RLS rule key dataset illustrated in Table 2, is created. The creation may be performed by a distributed analysis platform or by the data model service 118 using a machine learning (ML) model 120. In particular, the dataset illustrated in Table 1 is transformed into an example RLS rule key dataset with respect to customer ABC as shown in Table 2. The transformation may be performed by the distributed analysis platform or by the data model service 118 using a machine learning (ML) model 120.

At 306, a combination of distinct cell values for a customer name may be extracted and grouped by Territory and Vertical. In the current example, this is done with respect to customer name ABC and may be performed by the distributed analysis platform or by the data model service 118 using a machine learning (ML) model 120. For the example RLS rule key dataset in Table 2, the users in group US-SW-Tech can only see rows with Territory=US-SW and Vertical=Tech. Users in group US-NE-Fin can only see rows with Territory=US-NE and Vertical=Finserv. Users in group US-NE can only see rows with Territory=US-NE (but can see any Vertical within Territory US-NE). Users in group US can only see rows with Territory=US-SW or Territory=US-NE regardless of the "vertical" column. Users in group Admin can see all rows. Note that groups such as US and US-NE may be created with a blank (or null) for the "Vertical" column (and other columns) to allow for flexibility such as, for example, adding new users (readers) for accessing the dataset. Thus, the blank (or null) provides for "all values" in the "Vertical" column.

At 308, an index of the extracted combination of distinct values may be generated. The transformation may be performed by the distributed analysis platform or by the data model service 118 using a machine learning (ML) model 120. At 310, the extracted RLS rule key dataset and the index may be extracted in a search engine, e.g., Elasticsearch, as one or more documents 312 that may be stored, e.g., in storage services 106. At 314, a NLQ request may be received from a user member of the group US-SW-TECH, e.g., it may be determined that the user has a classification of US-SW-TECH. At 316, the NLQ request may be provided to a search engine for data within the NLQ query service 110. For example, the search engine may be part of the NLQ query service 110 or part of the computing services 104. In this example, at 316, the documents 312 within the search engine may be filtered for RLS rule keys for US=SW and vertical=tech. The result may be to filter fuzzy logic results of the NLQ request as well as any autocomplete for entry of NLQs from the user member of US-SW-tech group with respect to cell value: ABC RLS rule keys territory=US-SW and vertical=tech.

More particularly, the RLS ruleset schema is inspected to determine the combinations of columns that produce rule keys that need to be extracted so that the rule keys per cell value may be precomputed. In the current example this results in (i) all distinct value combinations of (territory, vertical) provide keys like territory=US-SW and vertical=Tech, (ii) all distinct territory values provide keys like Territory=US-SW, (iii) all distinct Vertical values provide keys like Vertical=Tech. These rules do not need any keys like this right now, but if an RLS row (groupname, territory, vertical) like (AllFinservGroup, <null>, Finserv) were created, then these keys would be needed. If the keys were not created apriori, then changing RLS rows might require re-ingesting index values i.e., all 2^n combinations of columns specified in the RLS rule dataset. This is done based on row values from the source dataset, not rule dataset values, because it is necessary to allow users to change the rows in the rule dataset and have it affect the NLQ query service 110 results immediately. Rows in rulesets change frequently. At indexing time (both initial and recurring), a new Elasticsearch is built with non-indexed column rule keys that contains all of the rule keys for that cell value across all rows, i.e. col X cell value "Secret Project XYZ" occurs on records with (Territory, Vertical) with (US-NE, Finserv), (US-NE, HR), (US-NE, Sales) then that would be three distinct rule keys added as an array into the single Elasticsearch document that is created for the "Secret Project XYZ" Elasticsearch document. Elasticsearch may store in each cell value Elasticsearch document, a list of all the rule key combinations that appear in the dataset for this distinct cell value. For a distinct cell value, it is provided that:

$$|RCVP| \leq \prod_{i=1}^{|Ruleset\ Columns|} |Distinct\ Values\ in\ Column\ i|$$

Note that it is necessary to accommodate for the "all values" case (max possible size of this combination): $|Rulekeys| \leq |RCVP| \times 2^{|Ruleset\ Columns|-1}$ RL It is this exponentially increasing size of rule keys per document that put a performance constraint on Elasticsearch that does not make it operate under autocomplete low-latency SLAs.

Thus, since the datasets, e.g., dataset 122, are extremely large (e.g., datasets may have millions of rows and thus millions of cell values), a single document may not be able to store all of the RLS rule key datasets 304 in the storage services 106. Thus, in configurations, RLS rule key datasets 304 may be stored among multiple documents. For example, a principal limit is the size of the document and the number of rule keys that may fit per document. Generally, how many may fit is a function of how large the rule column cell values are, how many rule column permutations there are per distinct indexable cell value, and how many rule columns there are. Thus, in configurations, rule column cell value permutations may be defined (RCVP) as the distinct rule column values (i.e., the values that actually occur in the underlying dataset for columns used in the rule set schema) per distinct indexable value (i.e., the distinct string values that the system is attempting to ingest). Because it is necessary to account for the "allow all" feature of RLS rule sets, it is necessary to build multiple rule keys per RCVP based on actual occurring values. The upper bound is blank (i.e., the pathological case where every RCVP has all distinct values for every rule set column.) To make the distinction between RCVPs and rule keys clearer, referring to Table 4 below provides an example: using the examples in Tables 1-3, where the rule key dataset has the rule columns "territory" and "vertical," assume there are five rows for customer ABC such as:

TABLE 4

| | Customer Name | Account ID | Territory | Vertical | Date |
|---|---|---|---|---|---|
| 1 | ABC | 123 | US-SW | Tech | Jan. 1, 2021 |
| 2 | ABC | 234 | US-SW | Tech | Jan. 1, 2021 |
| 3 | ABC | 345 | US-NE | Tech | Feb. 1, 2021 |
| 4 | ABC | 567 | US-NW | TV | Mar. 1, 2021 |
| 5 | ABC | 789 | US-NE | Tech | Apr. 1, 2021 |

From those 5 total rows, (here are 3 RVCPs for Customer Name ABC: (US-SW Tech), (US-NE, Tech), and (US-NW, TV), i.e., the distinct permutations of the territory and vertical columns for rows that have Customer Name=ABC. When it comes to building rule keys for documents that are being indexed, it is only necessary to consider the permutation of values that actually occur in the underlying data. These 3 RVCPs will produce 8 rule keys for ABC: US-SW, US-NE, US-NW, Tech, TV, US-SW and Tech, US-NE and Tech. US-NW and TV, which is below the theoretical max of $(2^2-1)*3=9$, because US-SW and US-NE both used the same value, "Tech", so a rule key was saved in this example. As mentioned in the above description, it is necessary to create rule keys for a powerset of all values in the RVCPs because it is necessary to handle ruleset rows that use the "allow all" feature. For example, if i had a ruleset row that had (user=ashtep, Territory=<null>, Vertical=TV), then when ashstep uses the NLQ query service 110, ashtep is allowed to see any customerName that occurs on a row with Vertical=TV, regardless of what Territories appear on those rows.

Due to the number of documents including large RLS rule key lists, a maximum RLS rule key size limit may be included per document. In configurations, the maximum may be 250,000 RLS rule keys per document. In configurations, each document may hold a total of 50,000 rule keys. Thus, there may be duplicate documents of the same cell value in the index. These duplicates may also be retrieved when a single user matches multiple rules on different documents. Hence, some post-processing for de-duplication is generally needed for results retrieved by the NLQ query service 110 in response to an NLQ or an attempted auto complete by the NLQ query service 110. Since there generally is a limit as to how many rule keys may be stored, even across multiple documents, in order to reduce the number of rule keys per document, the RLS rule keys may be sharded. Generally, rules that are sharded are those that tend to affect the most people. For example, the more specific rules generally affect fewer people and thus, are likely candidates for being removed from the RLS rule key datasets 304 to be stored in the documents. Alternatively, less specific rules generally affect more people and thus are more likely to be included in the documents storing the RLS rule key datasets 304.

Figure 4:
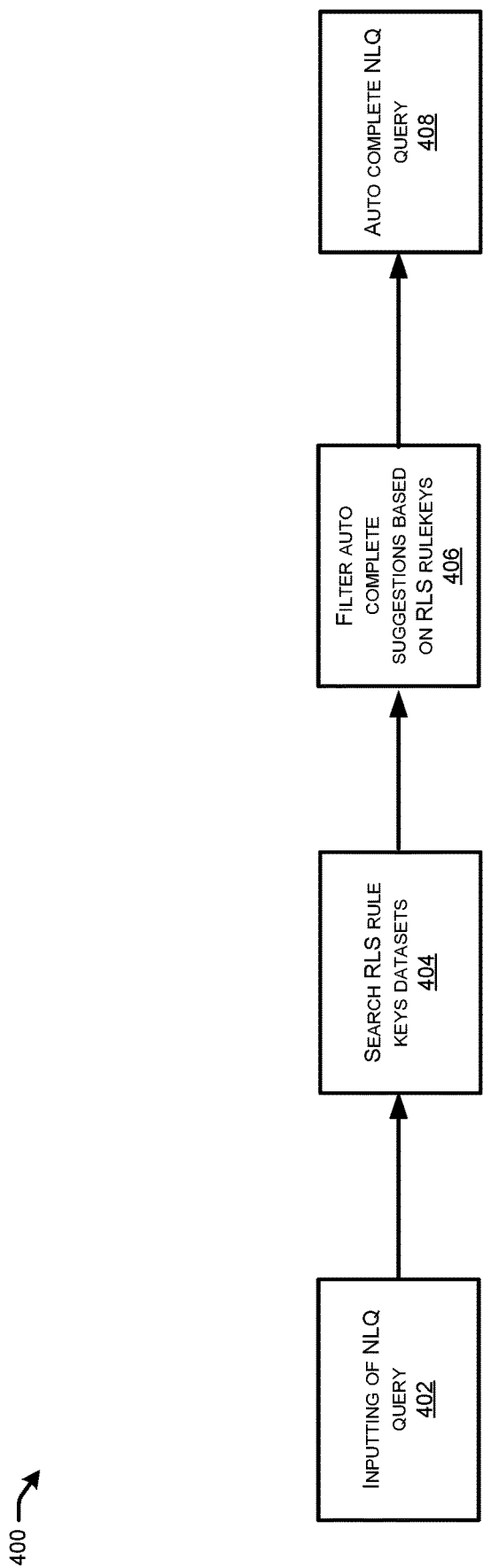
FIG. 4 schematically illustrates an example a flow for implementing RLS for auto complete in the NLQ query service.

In configurations, referring to FIG. 4, a flow 400 is schematically illustrated for implementing RLS for auto complete in the NLQ query service 110. At 402, a NLQ query is being input by a user, for example, user in a RLS group of US=SW and vertical=tech. Prior to auto completing the incoming the NLQ query, at 404 the RLS rule keys datasets are searched within the various documents by a search service, e.g., an elastic search service. At 406, the NLQ query service 110 filters any potential auto complete suggestions for the NLQ based on the RLS rule keys that are retrieved. At 408, as the query is being entered, the NLQ query service 110 auto completes the NLQ from the user 112 based on the RLS rule keys.

Generally, the creation of the RLS rule key datasets 304 may be performed when the data is ingested, e.g., entered into the BI service 108. When an NLQ query is being analyzed or when an auto complete suggestion is being considered, the RLS rule key datasets 304 may be retrieved and applied.

In configurations, the RLS rule datasets 304 may be queried in response to every NLQ with, for example, a potential use of cache for storing recent answers so that row changes (adding/removing groups/users) reflect quickly. In configurations, the RLS rule keys have rule columns that refer to data values in the underlying data, which is indexed periodically and thus the underlying data may be stale (despite the rules being fresh). Thus, the RLS rule key datasets 304 may be refreshed periodically. In configurations, the BI service 108 or the NLQ query service 110 may set the refresh rate, e.g., the periodicity of refreshing. Alternatively, an author or admin may set the rate of refreshing.

Authors and readers (e.g., users 112) often struggle with formulating NLQs for their data when they come to a topic "cold," e.g., no experience and/or no previous searches have been performed on the data (e.g., dataset 122. A topic generally comprises one or more datasets, which in configurations, may be a maximum of twenty datasets, e.g., dataset 122. A topic generally relates to various insights and areas within the datasets. The insights and information related to the topic are generally portrayed to the authors and readers in the form of dashboards, reports, graphs, etc. It has been determined that people with no prior experience searching using NLQs generally formulate NLQs in various different ways. Currently there is nothing that provides suggested synthetic questions to authors and readers on their data schema and data (only pre-canned questions on sample topics). In configurations described herein, synthetic NLQs (e.g., NLQs generated by the NLQ query service 110) provide readers and authors an immediate way to see a working NLQ and its answer with respect to their data, which provides grounding points for what is possible and the style of phraseology that works.

Generally, in configurations, a starting point for generating synthetic NLQs may include determining information present within a dashboard, e.g., dashboard 126. For example, if information present in the dashboard relates to sales, then synthetic NLQs may be generated that relate to sales. In configurations, however, since certain information is already present on the dashboard, the synthetic NLQ generally will present questions similar to what is on the dashboard but which will result in a different answer. Thus, synthetic NLQs are generally picked so that a diversity of features may be obtained and thus, several examples of what the data in the datasets contains may be provided. Often, NLQs are complex and not usually simple like "why did sales go down." Thus, the information within the question may point to various areas within the data with which synthetic NLQs may be generated.

In configurations, templates are provided for an organization to input their data. Generally, the data is input by a user, e.g., user 112, classified as an author. Synthetic NLQs may be generated as the data is being uploaded into the business service 108. The synthetic NLQs may be used to help train users as they are getting started using NLQs to search the data within the datasets. Additionally, the synthetic NLQs may be used when users hit a "dead end." Such a dead end may be a situation where users have been searching the data and have hit a period where the users are no longer asking questions but have not logged off the system. The synthetic NLQs may help the users come up with new NLQs for providing to the NLQ query service 110.

In configurations, a few (3-10) synthetic NLQs may be presented to readers (e.g., user 112) when the reader first clicks into a search bar displayed on the client device 114 for the user's selected topic so that the user 112 does not have to rely on author reviewed synthetic NLQs and are never staring at an empty search bar, struggling to come up with a NLQ. This may include filling in up to 10 synthetic NLQs in a "recently asked questions" list when there are not enough recently asked NLQs by the user 112 (as in a cold start case).

In configurations, a few (3-10) synthetic NLQs to may be presented to authors when they are creating a new topic with respect to a dataset, e.g., dataset 122, to help them get started asking NLQs against the topic that they are creating. Authors may get inspiration from synthetic NLQs to add new synonyms by recognizing that the language the NLQ query service 110 is suggesting is not exactly how they would expect people to ask questions on their topic.

In configurations, synthetic NLQs may be grouped by question type to help teach authors and readers about the breadth of question types that may be presented to the NLQ query service 110. Thus, 1-2 questions per question type may be presented to authors and readers to help them learn about the variety of the NLQ query service 110's capabilities.

In configurations, synthetic NLQs may be used as examples to introduce new question pattern features over time. For example, with "why" questions as a new feature, authors and/or readers may be shown "New Feature: why questions! now ask questions about your data such as "why did booked revenue decrease last year."

In configurations, as the synthetic NLQs are generated, the synthetic NLQs may be filtered to filter out nonsensical questions, e.g., questions that are incomprehensible and make absolutely no sense. To determine that a synthetic NLQ is incomprehensible, an ML model may be used that assigns a value to each synthetic NLQ representing an incomprehensibility of each synthetic NLQ and determines that the value meets or exceeds a threshold value. The ML model determines that the NLQ is incomprehensible based on the value meeting or exceeding the threshold value. Additionally, synthetic NLQs may be filtered out that cannot be answered by the data that is within the datasets. Synthetic NLQs may be generated by machine learning models and may also be used to train the machine learning models. Questions may be ranked and generally, the lower scores indicate the better synthetic NLQs. Generally, a language model may be used to evaluate and rank/score the generated synthetic NLQs.

The synthetic NLQs may also be utilized in a "did you mean" feature. The "did you mean" feature aims to provide related NLQs while users are typing their questions, e.g., an autocomplete feature. This is also a good way to provide examples for users to better construct their NLQs. Candidate NLQs may be from author-reviewed answers and reviewed synthetic NLQs. "Did you mean" synthetic NLQs may be triggered while user 112 is typing NLQs (autocomplete) or after NLQs are complete.

Figure 5:
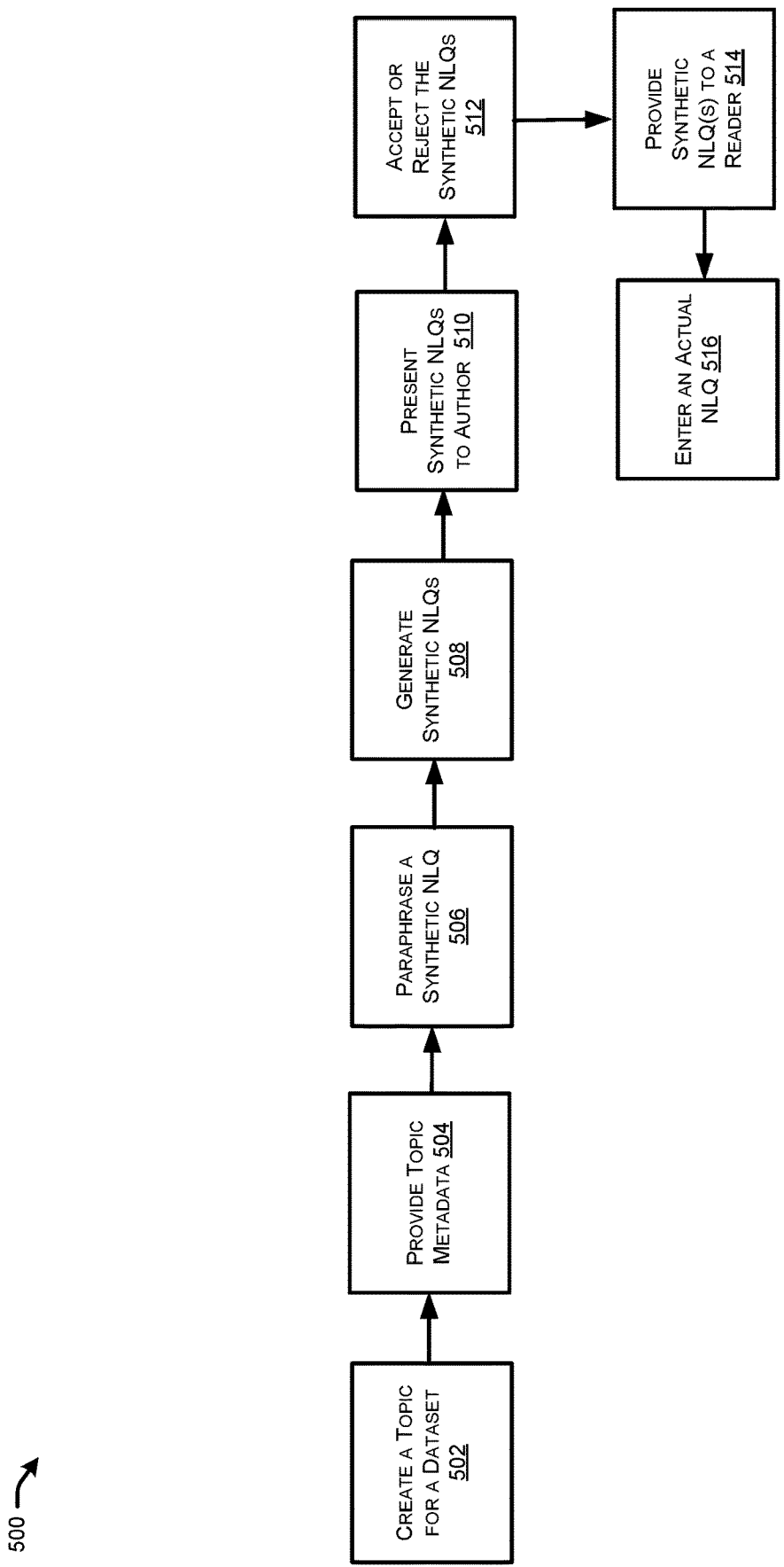
FIG. 5 schematically illustrates an example flow for generating synthetic NLQs within the NLQ query service of FIG. 1.

Referring to FIG. 5, a workflow 500 for generating synthetic NLQs includes at 502 an author creates a topic for a dataset, e.g., dataset 122. At 504, the author provides topic metadata such as user-friendly names for columns and popular cell values. At 506, one or more paraphrased synthetic NLQs may be generated based on global question patterns within the datasets, e.g., dataset 122, a user's topic metadata, and IR. The IR may be generated as described with respect to FIG. 2 herein. In order to obtain a high quality paraphrased synthetic NLQ the one or more synthetic NLQs may be filtered. For example, the one or more paraphrased synthetic NLQs may be filtered with respect to fluency using a language model in natural language to filter the less fluent paraphrased synthetic NLQs. For cycle consistency, the one or more paraphrased synthetic NLQs may be filtered based on which paraphrased synthetic NLQs are executable within the NLQ query service 110. Additionally, the one or more paraphrased synthetic NLQs may be filtered with respect to logic based on a knowledge graph. At 508, based on the one or more paraphrased NLQs, synthetic NLQs may be generated. At 510, the generated synthetic NLQs may be provided to the author for review. In some configurations, the generated synthetic NLQs are not provided to the author. In configurations, the author may execute the IR to get the corresponding visual (e.g., dashboard) so that the author may better understand the answer. At 512, the author may accept or reject the some or all of the synthetic NLQs, or in some instances may rephrase some or all of the synthetic NLQs to be more natural. At 514, when readers are typing their NLQs into a search bar, one or more related synthetic NLQs may be provided to the readers based on fuzzy matching or a semantic search. In particular, the IR may be generated from the user metadata and the IR may be translated into the synthetic NLQ. At 516, based on the related synthetic NLQs, the user 112 may enter an actual NLQ. The actual NLQ may be similar to or the same as one of the related synthetic NLQs.

More particularly, templates may be used for generating synthetic NLQs. Two example designs for providing the cold start synthetic NLQs may include (i) for each template, the set of the column name/cell value is determined so that all synthetic NLQs generated make sense, and (ii) a list of the synthetic NLQs according to the templates are provided to the author. The two designs both have pros and cons. For example, design (i) is interactive and the author may somehow control the intent he would like to express. But it might be tricky to select the items for the templates. For example, a question template show me [metric] by [groupby] and [groupby] may either lead to a complicated implementation since it is not fluent if the two groupby columns are the same. For design (ii), more complicated questions may be handled.

In configurations, a language model (LM) may be used to score and rank potential synthetic NLQs. A language model is a statistical model that assigns probabilities to words and sentences. Typically, the NLQ query service 110 may be trying to guess the next word w in a sentence given all previous words, often referred to as the "history." The losses used in training a language model may be used to evaluate if some text make sense or not. The lower scores indicate better scores.

As an example, for metric and groupby for show me [metric] by [groupby] for 2022, a template may include:

show me [metric] by [groupby] in 2002 show me [metric] and [metric] by [groupby] in 2002

The template may then be processed by the NLQ query service 110 using a machine learning (ML) model 116 within the NLQ query service 110 or a ML model 120 within the data model service 118. The results of processing the template may provide:

show me number of positions by country in 2002
show me open reqs and number of positions by country in 2002
show me open reqs by country in 2002
show me open reqs and number of positions by hiring manager in 2002
show me number of positions by location in 2002
show me number of positions by department in 2002
show me open reqs and number of positions by location in 2002
show me open reqs and number of positions by current status in 2002
show me open reqs by location in 2002
show me open reqs and number of positions by department in 2002

Applying a LM to score the results may provide and filtering by LM score <6:

Show Me [Metric]
3.47 show me open reqs
3.55 show me number of positions
5.53 show me days open
5.61 show me average monthly hires
5.89 show me top dispositions Show Me Number of [Groupby]
2.99 show me number of hiring manager
3.59 show me number of country
3.81 show me number of job category
3.84 show me number of unit
3.89 show me number of location
4.08 show me number of recruiter
4.11 show me number of department
4.37 show me number of employment type
4.45 show me number of current status
4.62 show me number of interview type
4.89 show me number of media source
5.02 show me number of position title 5.11 show me number of requisition status
5.14 show me number of disposition
5.17 show me number of age bucket
5.36 show me number of candidate email
5.41 show me number of candidate last name
5.55 show me number of candidate first name
5.75 show me number of fall out location What is [Metric] by [Groupby]

TABLE 5

| | A<br>LM score | B<br>metric | C<br>groupby | D<br>NLQ |
|---|---|---|---|---|
| 1 | | | | |
| 2 | 5.36641 | average monthly hires | country | what is average monthly hires by country |
| 3 | 4.80949 | average monthly hires | hiring manager | what is average monthly hires by hiring manager |
| 4 | 5.17752 | average monthly hires | location | what is average monthly hires by location |
| 5 | 3.19703 | number of positions | country | what is number of positions by country |
| 6 | 3.18755 | number of positions | hiring manager | what is number of positions by hiring manager |
| 7 | 3.71085 | number of positions | location | what is number of positions by location |
| 8 | 3.33 | open reqs | country | what is open reqs by country |
| 9 | 3.75009 | open reqs | hiring manager | what is open reqs by hiring manager |
| 10 | 3.69264 | open reqs | location | what is open reqs by location |
| 11 | 5.2516 | top dispositions | country | what is top dispositions by country |
| 12 | 5.26121 | top dispositions | hiring manager | what is top dispositions by hiring manager |
| 13 | 5.54206 | top dispositions | location | what is top dispositions by location |

As can be seen in Table 5, the process and scoring using a LM has produced synthetic NLQs and IRs (e.g., the metric and groupby). Authors may review the synthetic NLQs and may accept or reject them. In configurations, authors may rephrase the synthetic NLQs.

In configurations, the BI service 108 and/or the NLQ query service 110 may enrich dataset metadata with business semantics in order to improve NLQ answering. The dataset metadata may be enriched utilizing one or more of column synonym generation, interesting field ranking on unseen schemas, column time granularity prediction, and semantic type inference.

For example, with column synonym generation, a knowledge graph (e.g., using ConceptNet) may be traversed for a target phrase, such as "Patient", to generate candidate synonyms. A domain specific phrase may be generated to generate a prompt for a large language model to fill in. For example, using "Patient" the phrase generated might be "In the context of healthcare, Patient is <candidate>". The hydrated phrase may be ranked via an ensemble of similarity models.

In particular, a candidate list of synonyms for each phrase is generated. The synonyms are generally domain-relevant synonyms (aka aliases) for column names and cell values. In order to increase variability (i.e., recall), two approaches may be employed: graph-based and model-based. As an example, consider a domain entitled "Healthcare."

For the graph-based approach, synonyms from one or more public knowledge graph sources may be directly collected. For each target phrase (i.e., column name from schema), search each public source for the full text, and for all n-gram subsets of the text:

Target phrase=>"Health Service Area"
→search for "Health Service Area", "Health Service", "Service Area", "Health", "Service", "Area"

ConceptNet may be used as an example knowledge graph source of synonym candidates for the target text. The "Synonym" edge relation from 'target' word may be used to collect 'candidate' synonyms. Exact match search may be performed for the text phrase for text. In configurations, some fuzzy-match techniques may be used (i.e., index ConceptNet data in Elasticsearch).

Table 6 below illustrates example sample candidates that may be obtained using the example graph-based approach for the target phrase "Health Service Area".

TABLE 6

"Health Service Area" →
{ 'healths service area', 'health serve area', 'heartiness service area', 'health table service area',
  'health military service area', 'health religious service area', 'health service zone',
  'health service region', 'robustness service area', 'health service country',
  'health divine service area', 'health service expanse', 'health service areas',
  'health service of process area', 'healthiness service area', 'wellness service area',
  'health service sphere', 'health service track' }

For the model-based approach, a text generation model may be used to curate synonym candidates for a target phrase (which may be performed using a ML model 116 of NLQ query search service 110 or a ML model 120 of data model service 118). For each target phrase, a context sentence may be generated (with the phrase-to-be-replaced identified by some textual marker, e.g., single quotes.) A general pretrained encoder-decoder model may be fine-tuned to specifically replace the identified phrase with an alternate phrase and collect that candidate noted by the same textual marker in the output.

For example, using a model-based text generation model, e.g., one of ML models 116 or 120, an input may be: "paraphrase: in the context of health and healthcare, the health service area is Western New York </s> right carrot." The output may be "in the context of health and healthcare, the service region is Western New York." The following model settings and training parameters may be used as an example for synonym generation. The text generation model may be a T5 with base model and the context sentence template may be "in the context of [domain], the '[candidate_phrase]' is [cell_value_for_column]. The training data may be 25 topics to all domains, use_placeholder=true. An example number of training examples may be 5,441. The training settings may be batch size of 6, epochs of 3, training/dev split of 80/20, and warm up steps of 100. The model settings may be max length=64, do_sample=true, top_k=200, top_p=0.85, and num_return_sequences=50.

Example sample candidates that may obtained using this model-based approach using the example graph-based approach for the target phrase "Health Service Area" are listed in Table 6 below. The extracted synonym candidate in the output statement is "service region." The domain in the input and output were "health and healthcare." The target phrase in the input statement is "health service area". The context (from the cell value) in the input and output statements is "Western New York."

In configurations, once a set of candidate synonyms is generated for a target phrase, the candidate synonyms may be filtered using one of ML models 116 or 120 to include only those candidate synonyms that are most semantically relevant to the original target phrase. As may be seen in the examples printed above, there is a significant amount of noise in the samples collected/generated for a given target phrase. For example, lack of domain specificity in the public global knowledge graph (i.e., "service area" to "service surface area") and over-specificity for model generated candidates (i.e., "health service area" to "US state service area"). In order to overcome this, a context sentence may be generated with the candidate_phrase, which may be compared against a context sentence generated with the target_phrase to determine if the candidate phrase is indeed a valid substitution. As previously noted, a general pretrained encoder-decoder model may be fine-tuned to specifically replace the identified phrase with an alternate phrase and collect that candidate noted by the same textual marker in the output. The "context" may be provided by including the relevant domain for the target phrase, as well as a sample "cell value" associated with the target phrase in the original schema, e.g., dataset 122. For example:

→target_phrase="Health Service Area", candidate_phrase="Health Service Region", domain="health and healthcare", related_cell_value="Western NY":

"In the context of health and healthcare, the Health Service Region is Western NY"

vs

"In the context of health and healthcare, the Health Service Area is Western NY".

Figure 6:
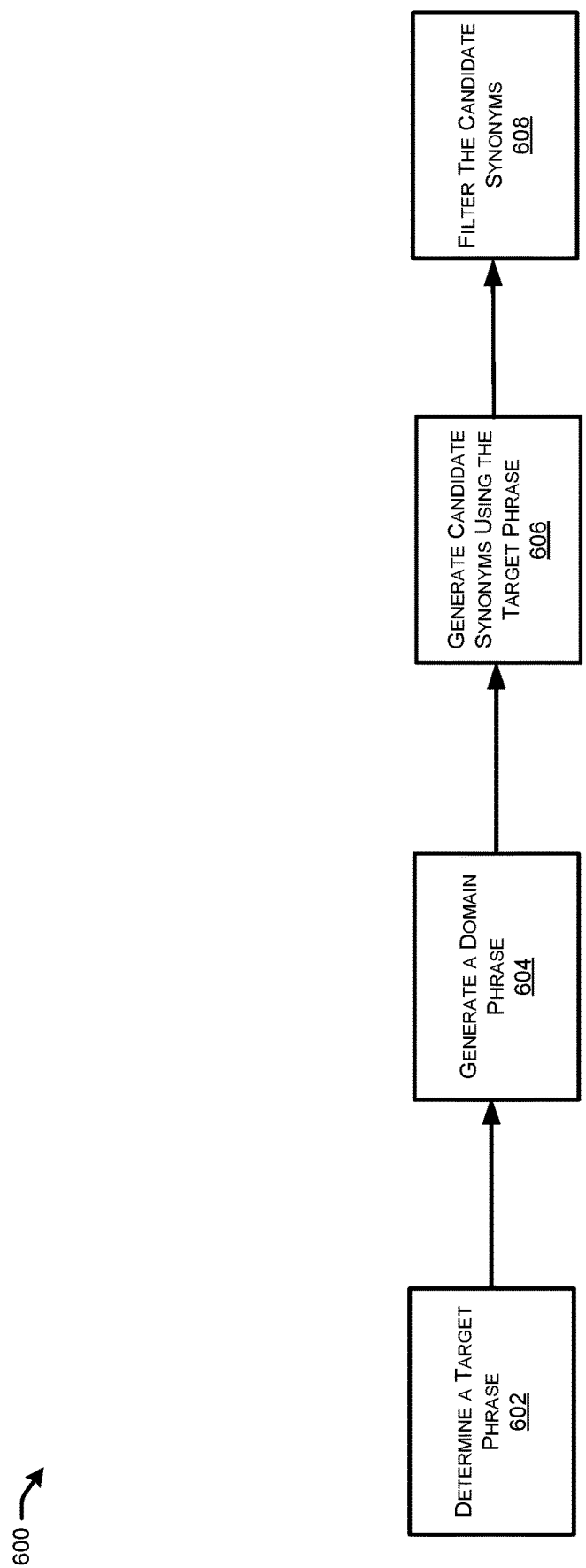
FIG. 6 schematically illustrates an example flow for generating one or more synonyms for columns of a dataset.

FIG. 6 schematically illustrates an example flow 600 for generating one or more synonyms for columns of dataset 122. At 602, a target phrase is determined. At 604, a domain specific phrase is generated to generate a prompt for a large language model to fill in. For example, using "Patient" the phrase generated might be "In the context of healthcare, Patient is <candidate>". At 606, the target phrase is used to generate candidate synonyms. For example, a knowledge graph (e.g., using ConceptNet) may be traversed for a target phrase, such as "Patient", to generate candidate synonyms. The hydrated phrase may be ranked via an ensemble of similarity models. In particular, a candidate list of synonyms for each phrase is generated. The synonyms are generally domain-relevant synonyms (aka aliases) for column names and cell values. In order to increase variability (i.e., recall),

TABLE 7

"Health Service Area" →
{ 'health care area', 'regulatory area', 'areas served', 'us state service area',
'revenue area', 'health service area', 'region', 'us state health service area',
'areas of service', 'providers area', 'areas covered', 'services', 'service area',
'sustainability area', 'areas covered by the state' } two approaches may be employed: graph-based and model-based. As an example, consider a domain entitled "Healthcare." For the graph-based approach, synonyms from one or more public knowledge graph sources may be directly collected. For a model-based approach, a text generation model may be used to curate synonym candidates for a target phrase (which may be performed using a ML model 116 of NLQ query search service 110 or a ML model 120 of data model service 118). For each target phrase, a context sentence may be generated (with the phrase-to-be-replaced identified by some textual marker, e.g., single quotes.) A general pretrained encoder-decoder model may be fine-tuned to specifically replace the identified phrase with an alternate phrase and collect that candidate noted by the same textual marker in the output.

At 608, the candidate synonyms may be filtered using one of ML models 116 or 120 to include only those candidate synonyms that are most semantically relevant to the original target phrase. As may be seen in the examples printed above, there is a significant amount of noise in the samples collected/generated for a given target phrase. For example, lack of domain specificity in the public global knowledge graph (i.e., "service area" to "service surface area") and over-specificity for model generated candidates (i.e., "health service area" to "US state service area"). In order to overcome this, a context sentence may be generated with the candidate_phrase, which may be compared against a context sentence generated with the target_phrase to determine if the candidate phrase is indeed a valid substitution. As previously noted, a general pretrained encoder-decoder model may be fine-tuned to specifically replace the identified phrase with an alternate phrase and collect that candidate noted by the same textual marker in the output. The "context" may be provided by including the relevant domain for the target phrase, as well as a sample "cell value" associated with the target phrase in the original schema, e.g., dataset 122.

With interesting fields ranking on unseen datasets (schemas) that are only just being input into the BI service 108, e.g., datasets that have not yet been accessed by users, e.g., authors, readers, etc., and have not yet been organized with topics defined or NLQs having been asked with respect to the dataset, a subset of fields is determined when a dataset is first input into the BI service 108 that are considered important to use for NLQ submission and answering. This situation is often referred to as a "cold start." Wide database schemas, denormalized columns, and data quality issues make question answering difficult and risk making adopting a question too difficult. In configurations, a Learn-To-Rank (LTR) machine learning model, e.g., one of ML models 116 or 120, may be used that takes an input schema and produces a total ranking/scores for how "interesting" each column of the dataset is.

More particularly, interesting fields may be provided to users, e.g., user 112, so that they may spend extra attention when annotating or reviewing associated metadata predictions. The intention is that by guiding authors to focus on fields (columns) that are most likely to appear in user NLQs, initial reader success after onboarding will be boosted. In configurations for a dataset, e.g., dataset 122 illustrated in Table 1, each field therein may be assigned an interesting score [0.0,1.0], which represents a normalized frequency of that field's usage across NLQs provided for that data source. In configurations, normalization may be scoped to a per dataset level (i.e., ten columns appear in NLQs for a given data set, column Y appears in two of those, therefore column Y is assigned a score of 0.2). In configurations, an extractive question and answer (QA) architecture with a custom loss function may be used in order to model LTR behavior across columns within the dataset to rank them according to a level of interest. The goal of an extractive QA is to predict the start/end span of some text with a larger "context" paragraph, which best represents the answer to the question. For this task the entire dataset schema is provided as "context" and the extractive QA architecture model, e.g., one of ML models 116 or 120, may be trained to predict the start span of the most interesting field name within that context. The question portion is implied and excluded from input.

Figure 7:
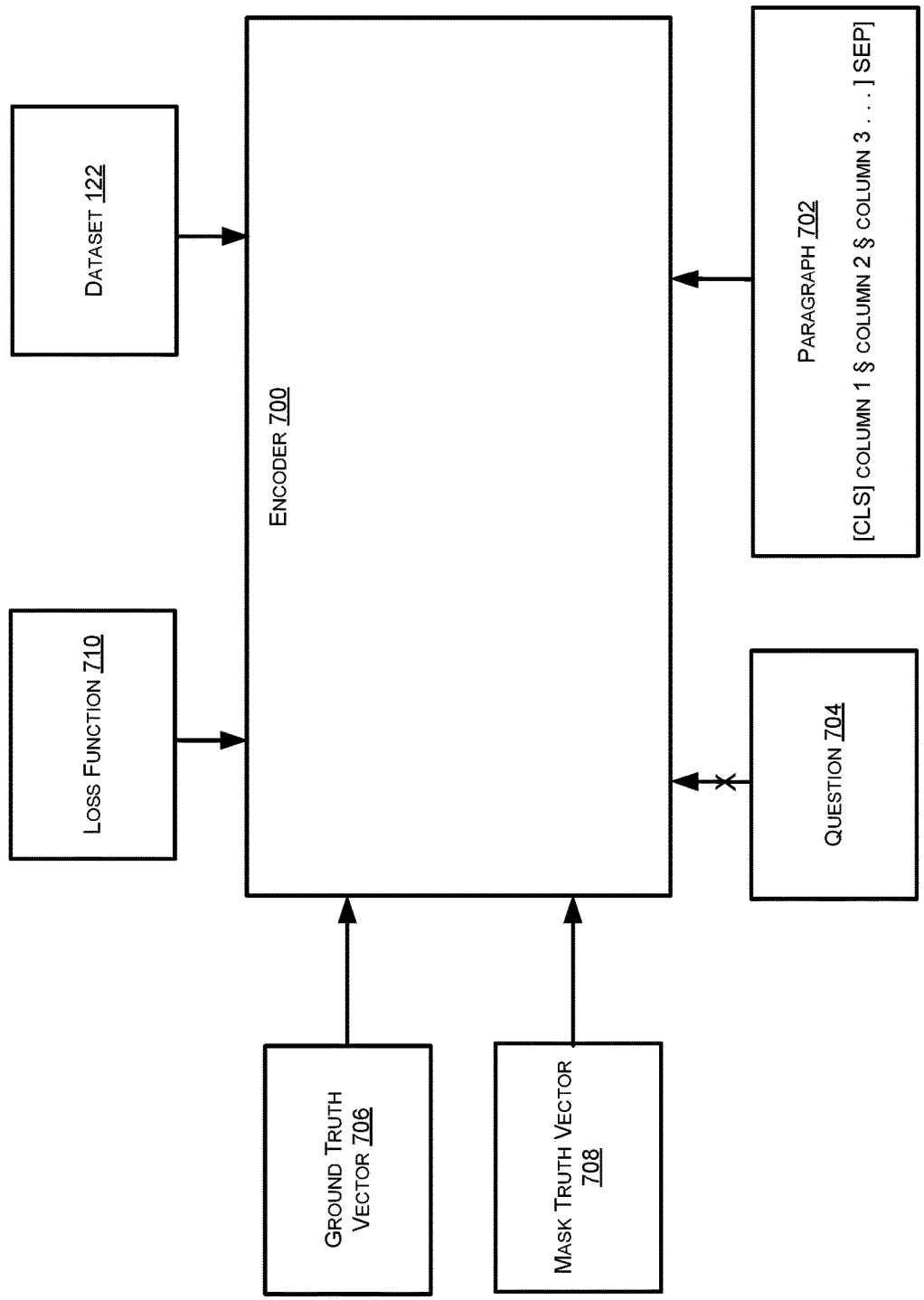
FIG. 7 schematically illustrates an example decoder that may be used to determine interesting fields of a dataset.

Thus, referring FIG. 7, the entire dataset 122 is input into an encoder 700, with each column name included, and separated by a specific separator token. "[CLS] column 1 § column 2 § column 3 . . . ] SEP]" serves as the input for a paragraph 702 or "context" portion of the extractive QA. In configurations, the question 704 is implied and thus not included specifically in the input. For each training example, a ground truth vector 706 may be included that represents the interesting score for the start token of each field within the dataset context. Also, a mask vector 708 may be included to highlight valid start tokens. A loss function 710 used in training a QA architecture model is a custom implementation that allows for assigning interesting values to each field name start token rather than the default extractive QA function that focuses only on selecting the top one best start/end span. The loss function acts as a list wise learning to rank loss function. Essentially, the function takes an approximate soft max across legit scores for each token in the input. Therefore, the predicted value for each input ID has an impact on the final value for every other input ID. As a result, score predictions (rankings) for the entire list are taken into account when calculating the final loss. At inference time, the start span probability score is taken for the token of each column in the dataset input and that is used to rank the set of columns in the dataset 122 from most to least interesting, returning the top k columns.

While the above approach for determining interesting fields has been described with respect to analyzing unseen datasets (schemas), determining interesting fields may also be performed when a dataset has been organized, topics have been defined, and the dataset has been searched with NLQs. Thus, when information is available as to usage of the dataset, a "usage signal," the usage signal may be used in conjunction with, or instead of, the information used from the cold start situation described above for determining interesting fields. If the usage signal is combined with the information from the cold start situation to determine interesting fields, the usage signal may be weighted more heavily than the signal from the cold start information. For example, the usage signal may be weighted in a range of 70% to 90%, while the cold start signal may be weighted in a corresponding range of 30% to 10%.

Date granularity for datasets, e.g., dataset 122, represents a feature to predict the granularity of a date column within a dataset, e.g., data set 122, illustrated in Table 1. The date granularity means to predict if the dates in the given column are in regular intervals such as daily, weekly, monthly, quarterly and yearly. Thus, date granularity attempts to predict the date granularity for that particular column. This prediction helps the NLQ query service 110 in answering NLQ questions posited by users, e.g., user 112, related to date aggregation such as monthly sales and yearly sales.

In configurations, an algorithm may be utilized by the NLQ query service 110 to predict date granularity for columns within a dataset. In configurations, the algorithm has a bias for lower granularity, e.g., if a column is predicted to have yearly granularity even though it is a monthly granular, then it is an issue because the NLQ query service 110 may reject this dataset, e.g., data set 122, when a NLQ for monthly data is requested by a user 112. To avoid this issue, the algorithm is thus biased for lower granularity. Additionally, in configurations, the algorithm predicts when high confidence is present. In configurations, the algorithm predicts a column state granularity only when there is more than a 90% confidence with respect to the predicted date granularity.

Figure 8:
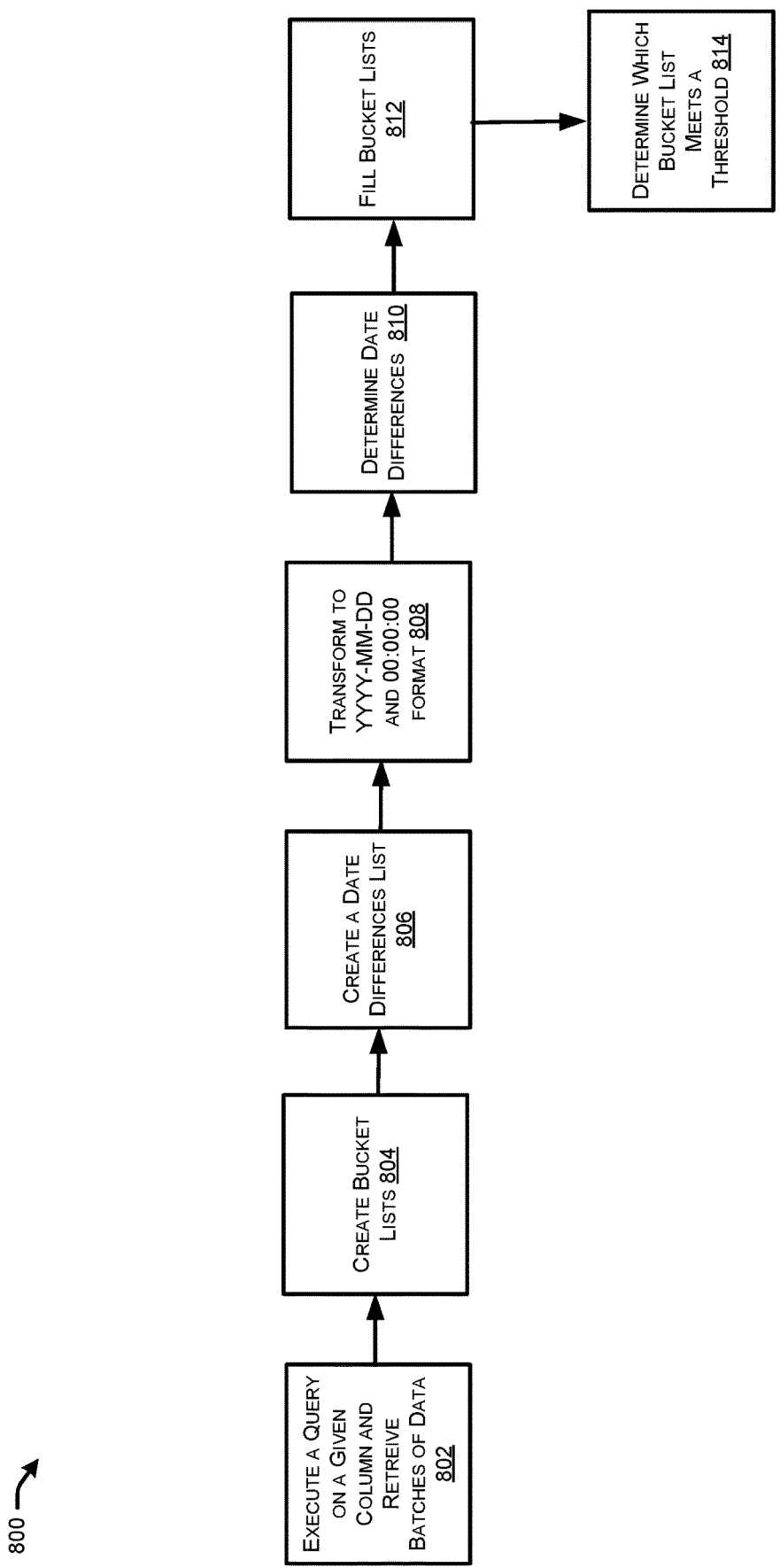
FIG. 8 schematically illustrates an example flow for predicting date granularity.

FIG. 8 schematically illustrates an example flow 800 for predicting date granularity using an algorithm. In configurations, the algorithm may be executed by the NLQ query service 110, or some other service within the BI service 108, including the BI service 108 itself. At 802, the NLQ query service 110 executes a query on a given column to sort the column and retrieve five batches of data with a batch size of fifty. In configurations, more or fewer batches may be retrieved and batch sizes may be smaller or larger than fifty. At 804, a day bucket list, a week bucket list, a month bucket list, a quarter bucket list, and a year bucket list are created to be used for further calculation. Thus bucket lists represent types of date differences. For example, date differences may be day, week, month, or year. At 806, a date differences list is created to hold the difference between two adjacent dates. At 808, for every batch of data, read each date and drop the hours, seconds and transform all the dates to a YYYY-MM-DD 00:00:00 format and append to one of the above lists. The list will be in sorted order because the input is sorted. At 810, day differences between each two adjacent days are determined and placed in the date differences list.

In configurations, based on the day differences, at 812, the bucket lists are filled based on the following conditions. If date differences is [1,2] append value to day bucket list. If date differences is [6,8], append the value to week bucket list. If date differences is [80,100], append value to quarter bucket list. Finally, if date differences is [350,375] append value to year bucket list. At 814, it is determined which bucket has more than 90% of the date differences. Based on this determination, the date granularity is predicted. In configurations, the percentage threshold may be higher or lower than 90%. If none of the buckets have 90% differences, then the date granularity is predicted to be none as there needs to be a high confidence to avoid a penalty, e.g., a rejection, on the dataset.

In configurations, a column is determined to be a date column by a semantic prediction or semantic type inference, as will be described further herein, therefore, the date granularity prediction needs to be executed after semantic type prediction of a column is completed with this dependency, there are two options to influence the date granularity functionality.

For datasets such as the example dataset in Table 1, there are two categories of types for columns: atomic (primitive) and semantic types. Atomic types such as, for example, integer, time and string provide physical, low-level type information while semantic types such as, for example, location, person, organization, etc., are much richer that can map columns to real-world concepts that may also exist ontology/knowledge graph. Semantic types not only can help potentially improve querying accuracy, but also can be leveraged to data integration tasks such as schema alignment. Semantic types can be used as additional dataset features for NEL models, e.g., NEL model 214, in both training and inference. Examples of use cases for semantic type include ML models interpreting the semantic meaning of a user's NLQ being trained to include additional semantic information, which should make their predictions more accurate. The semantic types may be used to ensure the models do not make clearly incorrect decisions. For example, there instances where a dataset contains a synthetic, numeric ID column and the NLQ query service responds to certain queries by summing these columns. Semantic types of these columns may be used to override aggregate functions predicted by the mode. Additionally, if two columns (from two datasets) have the same or very similar semantic types, then the two columns may be a matching pair in a schema alignment task.

In configurations, semantic types of a column may be obtained from two venues: one is from author input. Another is from a prediction from existing column metadata and cell values. In configurations, a confidence score of [0, 1] is included along with the semantic type, where predicted types may have a confidence score of less than 1, and a user input type does not have a confidence score. In configurations, semantic types are included as additional metadata for datasets in a topic.

In configurations, an algorithm leverages a set of heuristics and a pre-trained NER model (e.g., NER and RE model 208) to detect semantic types for columns. The detection algorithm takes as input a dataset ID d, then outputs predicted semantic types for each column on a best-effort basis. Sometimes the algorithm may not be able to detect the semantic type of a column due to lack of strong evidence or conflicting signals given by row values and metadata. An assumption of the algorithm is that a column should have a type that is defined by the NQL query service 110 (referred to herein as QS type). Except for a few QS types such as "Country" and "Date", the semantic types' corresponding to QS types are either string or integer. For those columns with QS types that are already semantic types (e.g., "Country", "City", "Date"), the algorithm will not predict semantic types. The algorithm detects string and integer columns separately where string columns' semantic types are detected first. It is because the existence of some semantic types may provide context for integer columns' semantic type detection. For example, if there is a "person" column, then the integer column with values ranging from 1 to 100 may be of semantic type "Age".

In configurations, the heuristics-based semantic type detection algorithm, taking as input a dataset ID d, comprise four steps:

(i) Metadata and cell value sample reading: read dataset metadata and a sample of row values of d.

The dataset metadata includes column metadata indexed by column id, with information such as its QS type.

The sample row values include a few rows randomly sampled from the dataset.

(ii) Preprocessing: iterate through every column id in the metadata and skip prediction for these columns if either of the below conditions is met, A column already has a semantic type.

Its QS type is a semantic type, such as "Country", "City", "Zip code" and "Date". In this case the predicted semantic type will just be its QS type.

(iii) Rule invocation: after preprocessing: each remaining column id is iterated through upon each iteration a series of rules is invoked to check whether a column can be detected as the rule's corresponding type. The rules may use cell value samples or existing metadata to predict a type. The rules are invoked in sequence in a short-circuit way, i.e., if a rule successfully generates a prediction, then the rest of the rules will not be invoked. Finally, an entity-recognizer rule is placed last in the order, where its NER model capability is leveraged. It is because the earlier rules are heuristics that are deterministic in nature and much cheaper to invoke. The list of rules may include:

Detect_age—Checks if the column name/aliases/friendly name is similar to the word "Age".

Detect_currency—Checks if the column name/aliases/friendly name is similar to words such as "USD, "GBP", EUR".

Similarity—checks if the column name/aliases/friendly name is similar to words such as "seconds", "hours", "minutes", "days", then outputs corresponding semantic type.

Detect_location—Checks if the column name/aliases/friendly name is "Country", "City" which already tells that it is a location.

Detect_bool—Checks if the cell value sample is a list of boolean values such as "Yes/No", "0/1" etc.

Detect_date—Checks if the cell sample contains a list of values that are in common date formats.

Detect_percentage—Checks if the cell values have "%" in the end

Detect_zip_code—Checks if the cell values are valid U>S> zip codes by using a Python geography library Detect_datepart—Checks if the column name/aliases/friendly name is similar to words such as "year", "month", "day", then outputs corresponding semantic type.

Detect_entity-recognizer rule_type.

If none of the previous rules can detect a type, then entity-recognizer rule is invoked using a pre-trained model, e.g., one of models 116 or 120. Each cell value in the sample will be fed through an entity-recognizer application programming interface (API) that outputs a type. A voting approach is adopted to output the majority type out of all cell values as the column type. For example, if 70% of the cell values are of type "City", 30% of the cell values are "Person", the entity-recognizer rule will output "City" as its predicted type.

For training a NER and RE model 208 for predicting a semantic type, the NER and RE model 208 takes as input a column (including its cell values and column name), and outputs the prediction of its semantic type. A semantic type (e.g., City, Date) is more expressive and intuitive than physical types (e.g., integer or string). ML based semantic type prediction uses an offline-trained neutral network to generate semantic type predictions. The offline training uses an external labeled dataset (as opposed to a user's data) and the labels come from an ontology. An advantage of offline model training is that the BI service 108 does not need to experience the latency of training, where model serving is generally fast. A byproduct of the neutral network is column embeddings, which may be useful to compare two columns. A downside is that the model does not work with out-of-dictionary cell values.

Figure 9:
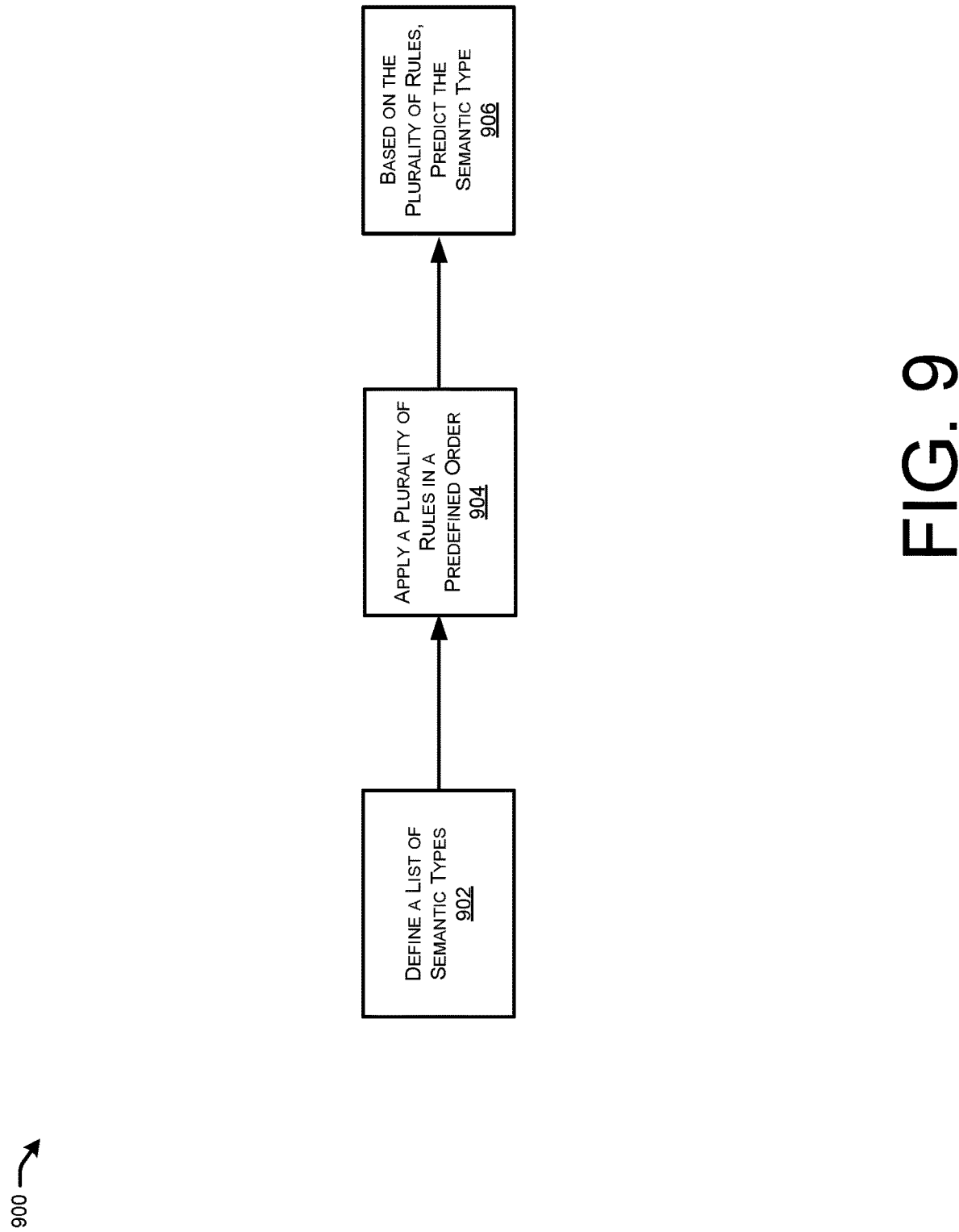
FIG. 9 schematically illustrates an example flow for predicting a semantic type.

FIG. 9 schematically illustrates an example flow 900 for predicting a semantic type. At 902, a list of semantic types may be defined. For example, a column should have a type that is defined by the NQL query service 110 (referred to herein as QS type). Except for a few QS types such as "Country" and "Date", the semantic types' corresponding to QS types are either string or integer. For those columns with QS types that are already semantic types (e.g., "Country", "City", "Date"), the flow will not predict semantic types. The flow detects string and integer columns separately where string columns' semantic types are detected first. It is because the existence of some semantic types may provide context for integer columns' semantic type detection. At 904, a machine learning (ML) model applies a plurality of rules in a predefined order. For example, each remaining column id that does not have a QS type (e.g., "Country", "City", "Date") is iterated through upon each iteration a series of rules is invoked to check whether a column can be detected as the rule's corresponding type. The rules may use cell value samples or existing metadata to predict a type. The rules are invoked in sequence in a short-circuit way, i.e., if a rule successfully generates a prediction, then the rest of the rules will not be invoked. Finally, an entity-recognizer rule is placed last in the order, where its NER model capability is leveraged. It is because the earlier rules are heuristics that are deterministic in nature and much cheaper to invoke. At 906, based on applying the plurality of rules in the predefined order, predicting, using the ML model, the semantic type to describe values in each column.

In configurations, a type of NLQ is a "Why" question, e.g., "why is revenue down in North America Q1 2022. In order to answer such questions, it is necessary to predict which factors are most likely to contribute to this change in metric so that various dimensions, e.g., columns of a dataset, of potential contribution can actually be analyzed to find insights. In particular, to answer "why" questions it is necessary to not only understand the intent of the user's question (what metric to analyze, what time period), but it is also necessary to automatically predict which factors to use.

A feature of BI service 108 is contribution analysis (CA). CA uses a date field on an x axis and a measure/metric on a y axis. To run a CA in the BI service, multiple parameters need to be provided currently. One parameter is metric/measure, which is a numerical field that is taken from the context of a dashboard. Metric/measure is the measure the measure used as the y axis. Another parameter is end date and start date, which are usually, respectively, the anomalous date and the date to compare to the anomalous date, e.g., the baseline. The baseline is the date when the value for the metric was as expected as opposed to the anomaly. Another parameter is dimensions, which are categorical fields for which one wants to check how the values of a given dimension contributed to the metric.

There is no simple, deterministic solution for recommending dimensions for a give metric/measure. It is never assured that among X dimensions out of Y dimensions any of the dimensions is the best contributor. There can always be a better contributor in the remaining dimensions. There are at least two approaches that can be taken to determine other contributors. First, worst contributors, which are dimensions that never make sense (strongly correlated to the metric, IDs, 90%+ nulls, extremely low entropy), can be removed. Thus, those dimensions can be filtered out. Second, the remaining dimensions can be ranked, by the probability of the remaining dimensions being a good contributor, e.g., a likely contributor that more than minimally contributes to changes in a metric. Ranking may help to prioritize the dimensions that are most likely to be contributors, so that they can be run in this ranked order and results can be presented to the user 112 as the results are determined.

There are a few different heuristics for finding dimensions that may be used. The goal for all of them is to find relationships between measures/metrics and dimensions that would indicate that these dimensions may be good contributors. The heuristics may be run at the topic creation time (or right after, asynchronously), so at the moment when the user 112 may be running CA, the recommended dimensions may be fetched in real time and with minimal latency.

Example heuristics may include:

Scan NQL query service 110 (referred to herein as QS type) visuals—Scan all QS visuals for a given dataset, get the dimensions used for filters and groupby's and rank them by frequency of usage (potentially different weights for filters vs groupby's). Can be used not only for getting popular dimensions, but also measures. Using scan QS visuals will rank contributors.

Scan QS questions—It would do the same as "Scan QS visuals", getting the data from IRs instead of visuals. Scan QS questions will rank contributors.

Entropy—Compute entropy of distribution of values for dimensions of a dataset. It's not normalized, but, intuitively, it will have value 0 if there is only one value for all rows of a given column, and it will increase along with increased variety, reaching the maximum value when every row has a different value for a given column (think IDs). The edge values will not be interesting. Ideally, middle values would be obtained. Considering entropy will remove worst contributors and rank contributors.

Anomaly detection based on user's runs—whenever a customer runs an anomaly detection, take the anomalies, run contributions analysis on them for all dimensions, and save the best contributors. Anomaly detection based on user's runs will rank contributors.

Anomaly detection—As above, but instead of depending on the user running anomaly detection, we can run it during topic creation. This type of anomaly detection will rank contributors.

Co-occurrence—Compute co-occurrence between measures and dimensions using logistic regression (or similar). The measures and dimensions with the highest or zero co-occurrence can be removed. Use the scores to rank others. Utilizing co-occurrence will remove worst contributors and rank contributors. In configurations, when calculating co-occurrences, some fields are continuous. In order to get such fields with continuous variables to fit within the computational paradigm, the values are binned, e.g., placed into buckets, in order to have the values work with integer-type equations. As an example, a nearest neighbors method of clustering and creating the bins for these values may be used.

CA usage data—Start reporting what dimensions were used for CA (ideally, with some score based on the variety of contributors). Use the frequency and score to recommend the dimensions in the future. Utilizing CA usage data allows for ranking contributors.

Domain—Get dimensions for a given dataset from knowledge graphs. Utilizing domain allows for ranking contributors.

"Why" questions use the CA to do the computations for determining factors contributing to the change of a metric value. The input to the CA primarily consists of the metric whose change is of most interest with respect to the why question. The allowed aggregations on that metric are SUM, AVERAGE, or COUNT. The queries run for CA are run per dimension. The CA code compares value of the metric (with respect to the given dimensions) in the start time to the value at the end time. The CA code is aggregated across those time periods. Thus, if the metric is sum (sales) and the end time range is the month of March, then the metric value CA will consider is the sum of sales for all of March. The ranges are given as expressions that act as row-level predicates, evaluating to true when a row is in the time range and false when it is not.

When picking contributors, the CA code sorts the contributors in order to provide the top k biggest contributors. Examples of how CA sorts the contributors include absolute difference contribution percentage, which is the absolute value of a contributor's difference contribution to a difference as a percentage, and deviation from expected percentage difference, which is the deviation from a contributor's expected percentage contributing to a change.

At inference time, each of the pieces of data are provided to the frontend of the model pipeline 200, so that it can call CA, in order to produce the Why visual. In configurations, Why questions may have their own set of postprocessing steps. If NQL query service 110 predicts a contribution analysis IR then the inputs to CA are provided where the metrics are the metrics from the IR in the metrics field. There should be exactly one metric, and it must have an aggregation that is sum, average, or count, since only those are supported by CA.

In configurations, the contribution dimensions may be determined by an offline process that runs as part of topic creation. This examines a dataset to predict what the most useful contributing dimensions may be for each metric field. In particular, the contribution dimensions may be determined as a separate API. The separate API takes a topic/dataset as an input and returns a structure that may contain recommended dimensions along with a numerical score that indicates how likely they are to become good contributors, when used in CA as a response to a "why" question. For example, consider a dataset with SIM tickets across an organization. The user 312 asks a question "why did my number of tickets in a division of the organization increase in the last week?" A recommended dimension for this metric in this dataset may be "severity" because if CA is run on "severity" between today and a week ago, it may be found find that "high" value contributed to 70%, which can give the user 312 a suggestion on what may be the root cause.

Figure 10:
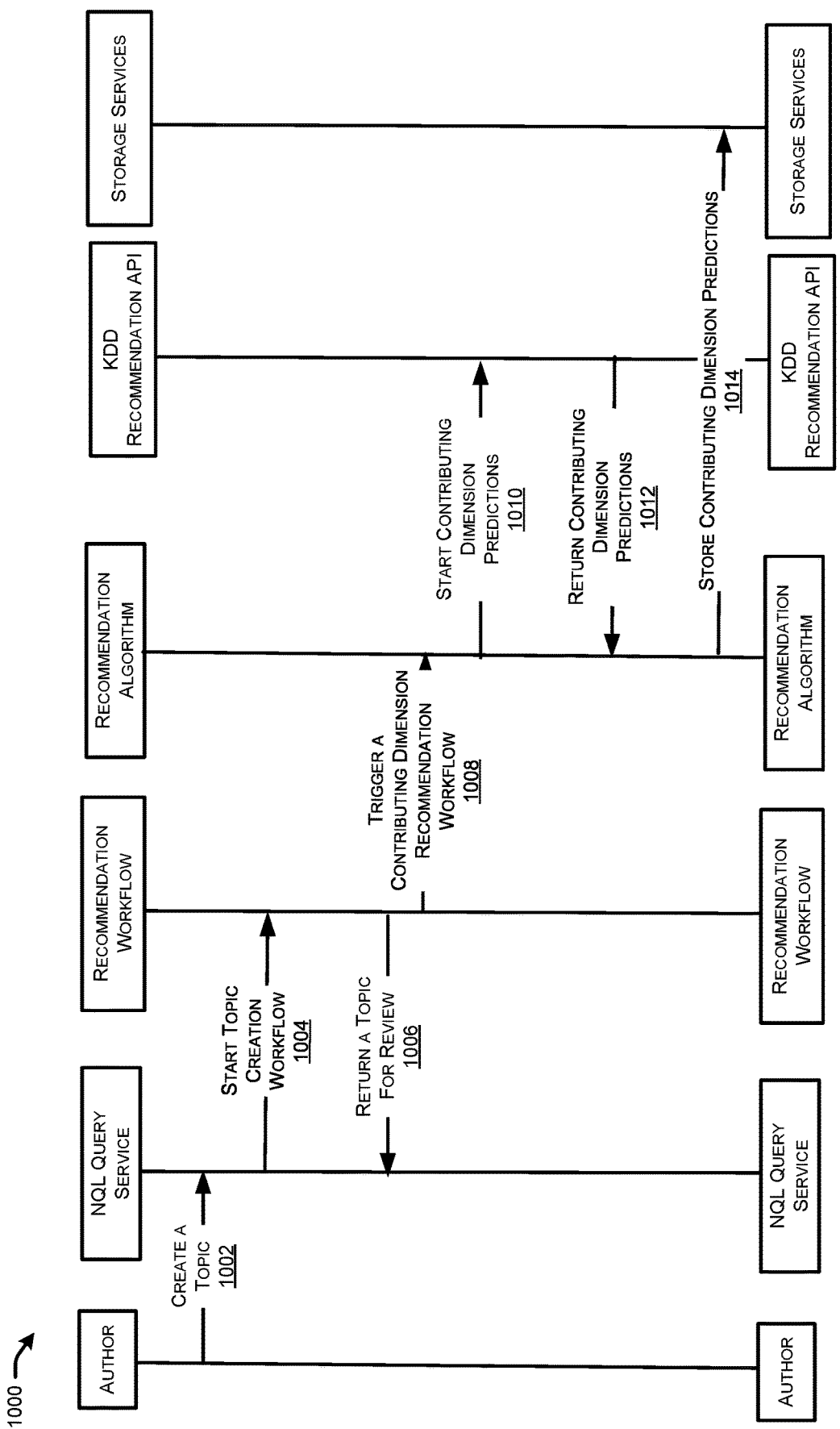
FIG. 10 schematically illustrates an example workflow for generating contributing dimensions recommendation (prediction) offline/asynchronously FIG. 11 schematically illustrates an example flow for CA analysis at topic creation time that may be implemented by an algorithm.

FIG. 10 schematically illustrates an example workflow 1000 for generating contributing dimensions recommendation (prediction) offline/asynchronously. At 1002, an author creates a topic. The topic is related to a dataset, e.g., dataset 122. For example, a topic generally comprises one or more datasets, which in configurations, may be a maximum of twenty datasets, e.g., dataset 122. A topic generally relates to various insights and areas within the datasets. The insights and information related to the topic are generally portrayed to the authors and readers in the form of dashboards, reports, graphs, etc. At 1004, the NQL query service 110 starts a topic creation workflow based on an author's request. At 1006, the NQL query service topic creation workflow referred to as (topic creation workflow) returns a topic for review to the author. At 1008, the topic creation workflow triggers a contributing dimension recommendation workflow. For example, the contribution dimensions may be determined as a separate API. The separate API takes a topic/dataset as an input and returns a structure that may contain recommended dimensions along with a numerical score that indicates how likely they are to become good contributors, when used in CA as a response to a "why" question.

As previously noted, example heuristics may include:

Scan QS visuals—Scan all QS visuals for a given dataset, get the dimensions used for filters and groupby's and rank them by frequency of usage (potentially different weights for filters vs groupby's). Can be used not only for getting popular dimensions, but also measures. This will rank contributors.

Scan QS questions—It would do the same as "Scan QS visuals", getting the data from IRs instead of visuals. This will rank contributors.

Entropy—Compute entropy of distribution of values for dimensions of a dataset. It's not normalized, but, intuitively, it will have value 0 if there is only one value for all rows of a given column, and it will increase along with increased variety, reaching the maximum value when every row has a different value for a given column (think IDs). The edge values will not be interesting to us, ideally, we would get middle values. This will remove worst contributors and rank contributors.

Anomaly detection based on user's runs—whenever a customer runs an anomaly detection, take the anomalies, run contributions analysis on them for all dimensions, and save the best contributors. This will rank contributors.

Anomaly detection—As above, but instead of depending on the user running anomaly detection, we can run it during topic creation. This will rank contributor.

Co-occurrence—Compute co-occurrence between measures and dimensions using logistic regression (or similar). Remove the ones with the highest or zero co-occurrence. Use the scores to rank others. This will remove worst contributors and rank contributors.

CA usage data—Start reporting what dimensions were used for CA (ideally, with some score based on the variety of contributors). Use the frequency and score to recommend the dimensions in the future. This ranks contributors.

Domain—Get dimensions for a given dataset from knowledge graphs, e.g., built on top of Nautilus datasets. This ranks contributors.

At 1010, contributing dimension predictions are started by the NQL Query service 110 recommendation workflow (recommendation workflow). At 1012, the separate recommendation API returns contributing dimension predictions. At 1014, the recommendation workflow stores the contributing dimension recommendations. For example, the recommendation workflow may store the contributing dimension recommendations in the storage services 104. At the moment when the user asks a why question, the recommended dimensions need to be retrieved and adjusted based on the input (metric and date field), e.g., remove dimensions that are highly correlated to the input date field. In configurations, if the recommendation workflow is still running or if there are no contributing dimension recommendations, if the user 312 inputs a why question, then an error message or page may be returned to the user 312.

Figure 11:
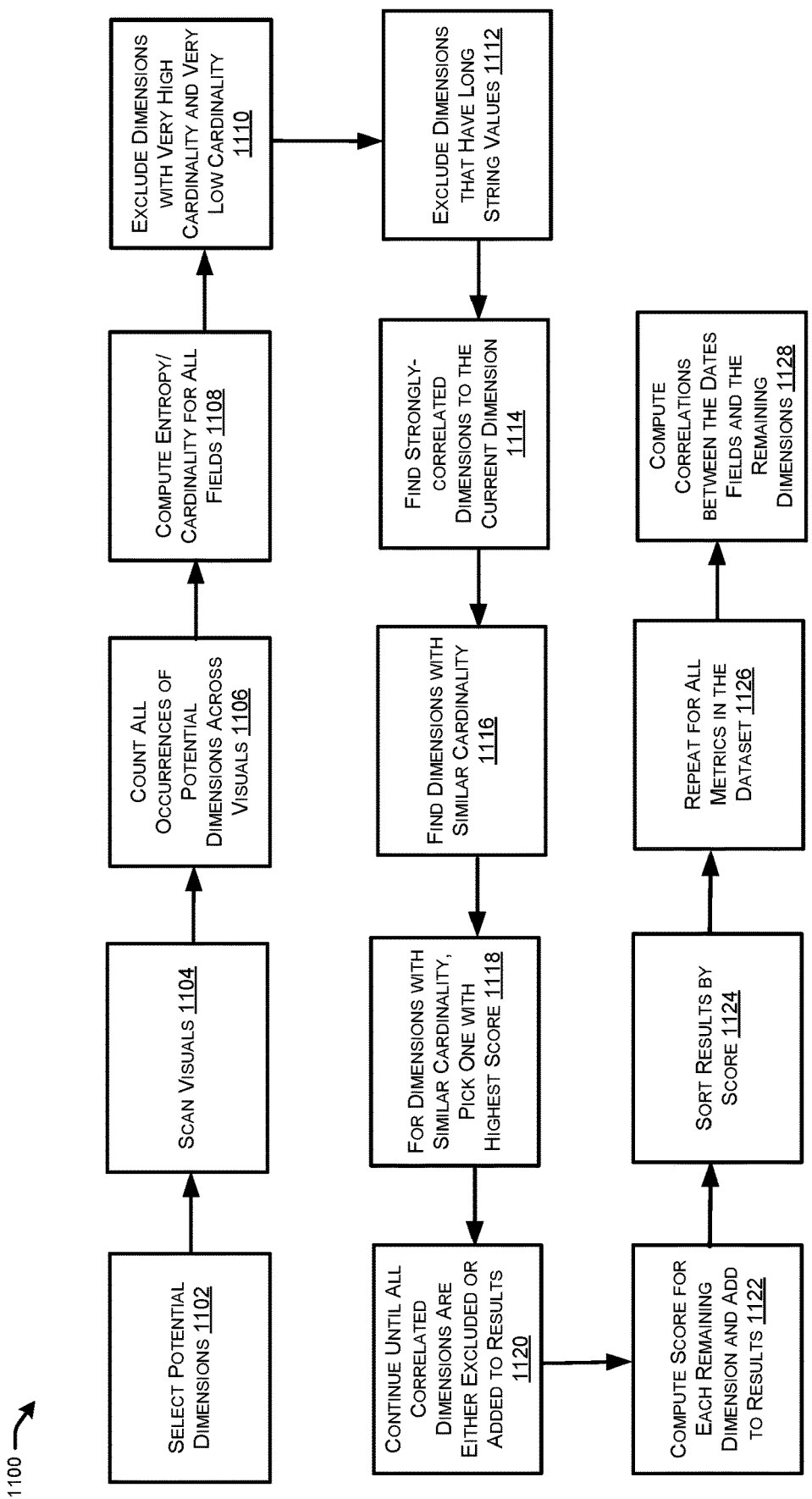

FIG. 11 schematically illustrates an example flow 1100 for CA analysis at topic creation time that may be implemented by an algorithm. At 1102, select potential dimensions, e.g., columns. At 1104, scan visuals that are displayed by BI service 108 or NQL query service 110 on the client device 114. For example, obtain all visuals, e.g., dashboards, reports, etc., for a given analysis. At 1106, count all occurrences of potential dimensions across visuals. At 1108, compute entropy/cardinality for all fields. At 1110, exclude dimensions with very high cardinality (e.g., more than or equal to 95% of sample size) and very low (0, 1) cardinality. In configurations, high cardinality=90% to 95% of the sample value. This is mainly set at this level to filter out IDs. In configurations, high cardinality may be lower. At 1112, exclude dimensions that have long string values (e.g., at least one value with more than 100 characters). At 1114, iterate through remaining dimensions and for each find strongly-correlated (co-occurrence greater than or equal to 95%) dimensions to the current dimension. At 1116, go through all correlated dimensions and for each find the dimensions with similar cardinality. Similar cardinality may be defined using cardinality_ranges=[[1, 2], [3, 10], [11, 100], [101, 1000], [1001, 10000]]. If two variables have cardinalities in the same range, they are treated as the same cardinality. In configuration, an approach based on a ratio may be used. At 1118, out of the dimensions with similar cardinality, pick the one with the highest score and add it to the results.

At 1120, continue until all correlated dimensions are either excluded or added to the results. At 1122, compute a score for each remaining dimension and add them to the results. At 1124, sort results by score. At 1126, repeat for all metrics in the dataset and try to also remove dimensions highly correlated to the metric. At 1128, compute correlations between the dates fields and the remaining dimensions (to be used at runtime in response to a why question to filter out dimensions correlated to the date used in the why question).

In case of a dataset without analysis, it may be assumed that potential dimensions may be of string/attribute physical type in the BI service 108 or NQL query service 110. During analysis, a dimension/measure setting in the BI service 108 or NQL query service 110 may be used, which can effectively allow numbers or dates to become dimensions as well.

In configurations, a score may be a number between 0.00 and 10.00. The score may be composed of two parts, each having a max value of 5. The first part is an entropy score, normalized to 0-5 range. This may be done because we the highest possible entropy value for the sample size is known, which in configurations is 13.28771 for 10 k values, which would correspond to a value 5.00 in the score. The second is a visual scan score. All visuals are examined and if one is found that uses a given dimension as a filter or a groupby, the score is incremented by 1.0 if the metric on the visual was the one on which the score was being calculated. The score is incremented by 0.5 if the metric is different. In configurations, the visual scan score is not normalized. Any score, over 5 points is represented as 5 points.

In configurations, the dimension recommendation is handled by the BI service 108 or the NQL query service 110 offline. Once fully configured authors and readers will be able to ask why questions and, in seconds, be able to view the top contributors to their metric of interest. While the offline workflow runs, authors are not blocked from sharing the topic. However if a user were to try to ask a why question before the dimension recommendation workflow completes, the user may get the why-specific "cannot answer" message. In configurations, the dimension recommendation workflow re-runs each time the topic refreshes. This means that a given metric may have a different set of recommended dimensions if the underlying data has changed.

In configurations, time in why questions may be treated as a span. For example, in the question "Why did sales go down in August?" August may be used as the ending span (August 1-31) and the month prior (July 1-31) may be used as the starting span, as opposed to comparing two discrete points in time, e.g., comparing sales on August 1st to sales on August 31st. The reason this is done is to try to capture the trend in data and avoid answers that may confuse readers. For example, in a discrete point in time comparison, it is possible that sales on August 31st may be higher than August $1^{st}$. This may lead the NLQ query service 110 (handling the why question) to present an increase contribution analysis results that may not align with an overall downward trend for the rest of the month. In configurations, start and end time ranges may be determined by the ML models, e.g., ML models 116 and 120, predicting a date filter that describes the end time range. The BI service 108 or NQL service 110 post processing may apply rules to determine the start range.

may contain predicted contributing factors, directionality indicator, sort type. The time range may be indicated using a regular date filter in the existing filters field. Table 8 below provides example rules the NQL query service 110 should enforce for the ML IR 224.

TABLE 8

| | Error | Description |
|---|---|---|
| 1 | 1 Date Filter | There should be exactly one date filter (relative date filter or date range filter) |
| 2 | 1 Metric | There should be exactly one metric. |
| 3 | Unsupported Agg | The only supported aggregation functions are SUM, AVERAGE, and COUNT |
| 4 | No open-ended range | Date range filters must have both a minimum and a maximum. |
| 5 | Must start with "why" | If there is a contributionAnalysis section in the IR, then the NLQ must start with the word "why" |
| 6 | No future dates | Don't support "future" questions, so:<br>1. Date range filters can't have max dates that are later than today.<br>2. Relative date filters can't use the "next" function.<br>3. Relative date filters can't use the "this" function with any time granularity other than Day.<br>4. Relative date filters can't use the "last" function with any time granularity other than Day. |
| 7 | No small time granularity | Don't support time granularity less than day. |
| 8 | No groupby | Don't support groupby questions like "why did sales increase by region?" |
| 9 | No inverse date filters | Don't support inverse date filters like "why did sales increase not in August?" |

In configurations, the user defined span is compared with the span of equivalent length that immediately precedes it. A special case may be how quarters are treated. Because quarters have unique characteristics and business implications, it may not be an apples-to-apples comparison to compare Q1 to Q4, so instead compare Q1 to the Q1 that last occurred in the data. For example, if Q1 2022 was the ending span, Q1 2021 would be used as the starting span.

In configurations, the body of a why question answer may be a table of narratives, displayed on the client device 114, and may be part of a dashboard. The table summarizes the significant changes from the automatically selected contributors. Each narrative may state 1) the measure (e.g., Sales), 2) the most significant value (for example showing Irvine from a field for Branch) from the recommended dimension, 3) the change in both raw numbers and a percentage, and 4) what the expected contribution was based on the start period.

In configurations, the table may be used whether the data increased or decreased, and does not change whether the user asked "why did sales go up last quarter" or "why did sales go down last quarter". In both cases, the elements of the table may be the same and only the data may be updated.

However, in the event that no change was detected, the user 312 may be presented with a "no-change" visual that only provides the restatement and contextual sentence. In configurations, there is no threshold for a no change answer. The values need to be an exact match. How often the user 312 encounters this answer may depend on the metric they are asking about. For fast moving metrics (those whose value changes frequently), the odds of hitting this answer are unlikely. However, users that ask about slower moving metrics may see this screen more frequently. It is expected that the majority of why questions will pertain to faster moving metrics.

As previously noted, CA uses IR. The ML IR 224 of the model pipeline 200 may be used to determine IR. A top level field with key "contribution Analysis" may be added. The presence of this key with a non-empty value indicates the IR is a contribution analysis IR. The contribution Analysis field In configurations, the FE IR 228 of the model pipeline 200 has the same changes as ML IR 224, except that the time range is also in the contribution Analysis field instead of in the filters. IR post-processing 226 of the model pipeline 200 converts from the ML IR 224 to the FE IR 228. The IR post-processing 226 receives the initial IR from the ML IR 224 and transforms it applying deterministic post-processing for advanced NLQ query service-specific handling, default filters, etc. Additionally, the ML IR validation rules of Table 8 are enforced by the IR post-processing 226. The IR post-processing 226 also extracts the metric and calls the NQL query service 110 to get the contributing dimensions. The contributing dimensions are added to the CA section of the IR. If the IR contains a filter on a column that is also being used as a contributing dimension, then the IR post-processing 226 removes that column from the contributing dimensions list. If there are no predicted contributing dimensions (after removing any that were used as filters), then the IR post-processing 226 returns an error response. The IR post-processing 226 creates date filters for start and end date ranges.

FIGS. 12-15 illustrate flow diagrams of example methods 1100 and 1200 that illustrate aspects of the functions performed at least partly by the services as described in FIGS. 1-11. The logical operations described herein with respect to FIGS. 12-15 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 12-15 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 12:
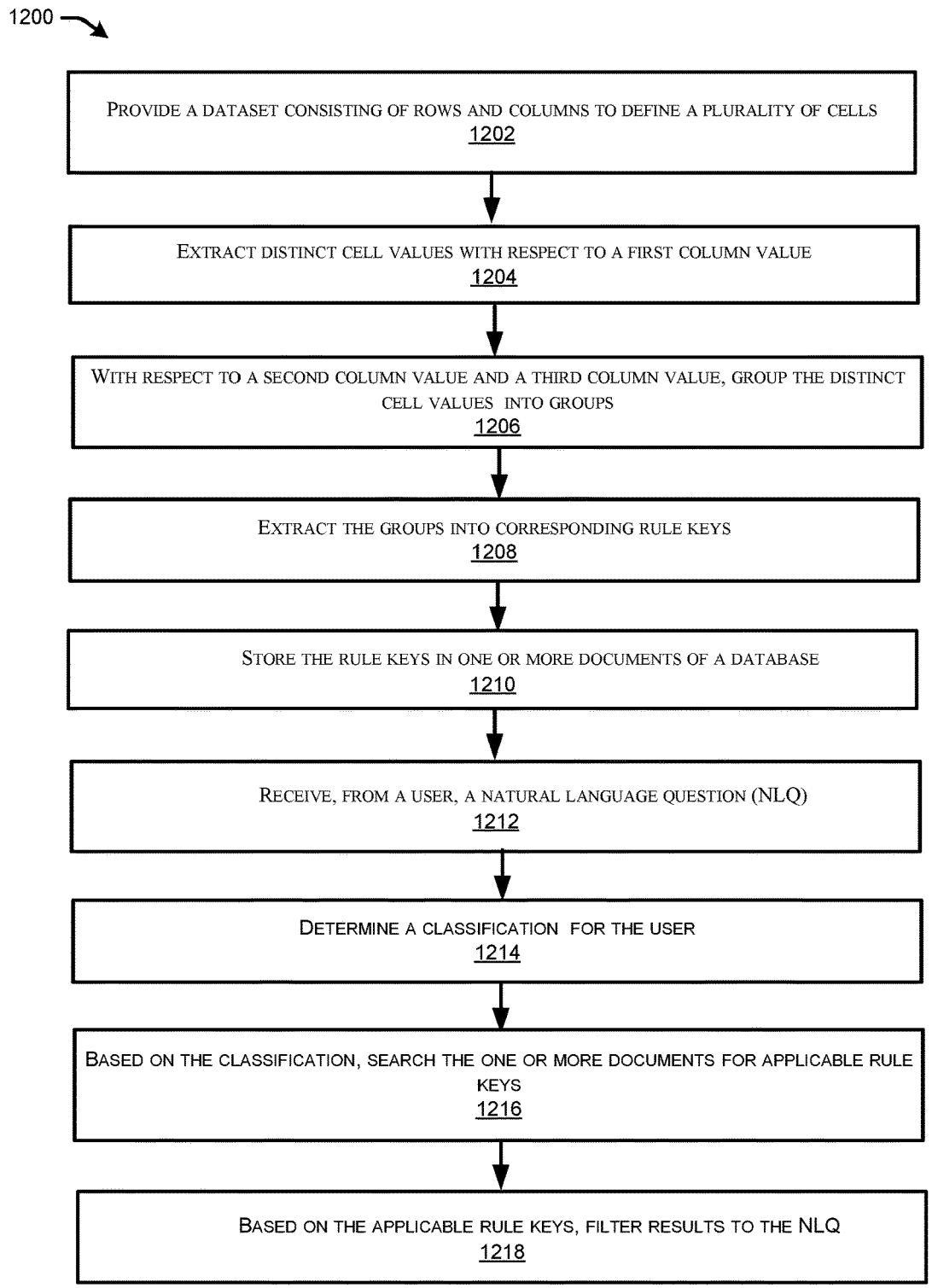
FIG. 12 is a flow diagram of an example method for applying row level security (RLS) to NLQs with a NLQ query service within a business intelligence service within a service provider network e.g., the service provider network of FIG. 1.

FIG. 12 illustrates a flow diagram of the example method 1200 for applying row level security to NLQs, with a NLQ query service, e.g., NLQ query service 110, within a business intelligence (BI) service, e.g., BI service 108, within a service provider network, e.g., service provider network 100.

At 1202, a dataset consisting of rows and columns to define a plurality of cells is provided. Each cell of the plurality of cells has a cell value, which thereby results in a plurality of cell values. For example, a dataset similar to the dataset illustrated in Table 1 is provided.

At 1204, distinct cell values are extracted with respect to a first column value. For example, the dataset illustrated in Table 1 is distinct cell values with respect to customer name may be extracted. The extraction may be performed by the data model service 118 using a machine learning (ML) model.

At 1206, with respect to a second column value and a third column value, the distinct cell values are grouped into groups. For example, the dataset illustrated in Table 1 is transformed into an example RLS rule key dataset with respect to customer ABC as shown in Table 2. The grouping may be performed by the data model service 118 using a machine learning (ML) model. For the example RLS rule key dataset in Table 2, users in group US-SW-Tech can only see rows with Territory=US-SW and Vertical=Tech. Users in group US-NE-Fin can only see rows with Territory=US-NE and Vertical=Finserv. Users in group US-NE can only see rows with Territory=US-NE (but can see any Vertical within Territory US-NE). Users in group US can only see rows with Territory=US-SW or Territory=US-NE regardless of the "vertical" column. Users in group Admin can see all rows. Note that groups such as US and US-NE may be created with a blank (or null) for the "Vertical" column (and other columns) to allow for flexibility such as, for example, adding new users (readers) for accessing the dataset. Thus, the blank (or null) provides for "all values" in the "Vertical" column.

At 1208, the groups are extracted into corresponding rule keys as an index. For example, the example RLS rule key dataset in Table 2 may be transformed into an index by extracting the combination of distinct cell values for customer name group by Territory and Vertical as illustrated in Table 3. The extraction may be performed by the data model service 118 using a machine learning (ML) model.

At 1210, the rule keys are stored in one or more documents of a database. the extracted RLS rule key dataset and the index may be extracted in a search engine, e.g., Elasticsearch, as one or more documents 312 that may be stored, e.g., in storage services 106.

At 1212, a natural language question (NLQ) is received from a user. For example, a NLQ request may be received from the user 112.

At 1214, a classification is determined for the user. For example, the NLQ request may be received from a user member of the group US-SW-TECH, e.g., it may be determined that the user has a classification of US-SW-TECH.

At 1216, based on the classification, the one or more documents are searched for applicable rule keys. For example, the documents 312 within the search engine may be filtered for RLS rule keys for US=SW and vertical=tech.

At 1218, based on the applicable rule keys, results to the NLQ are filtered, where the results are from rows of the dataset. For example, the result may be to filter fuzzy logic results of the NLQ request as well as any autocomplete for entry of NLQs from the user member of US-SW-tech group with respect to cell value: ABC RLS rule keys territory=US-SW and vertical=tech.

Figure 13:
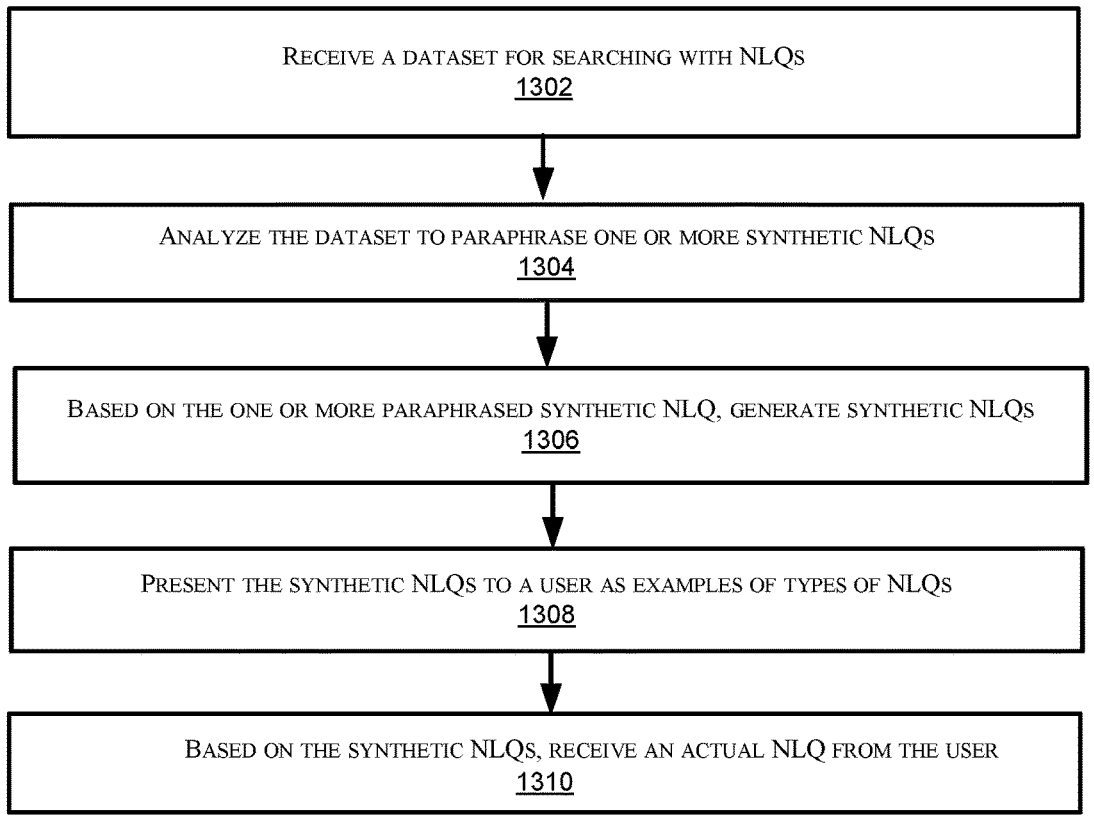
FIG. 13 is a flow diagram of an example method for generating synthetic NLQs with a NLQ query service within a business intelligence service within a service provider network e.g., the service provider network of FIG. 1.

FIG. 13 illustrates a flow diagram of the example method 1300 for generating synthetic NLQs with the NLQ query service, e.g., NLQ query service 110, within a business intelligence (BI) service, e.g., BI service 108, within a service provider network, e.g., service provider network 100.

At 1302, a dataset is received for searching using natural language questions (NLQs). For example, the data may be stored as one or more datasets 122 in the storage services 106 in tabular form. The one or more datasets 122 may be input by the user 112. Generally, the user 112 is an author that has control and authority of the one or more datasets 122 that are input and stored.

At 1304, using a first machine learning (ML) model, the dataset is analyzed to paraphrase one or more synthetic NLQs. For example, the author may provide topic metadata such as user-friendly names for columns and popular cell values. The one or more paraphrased synthetic NLQs may be generated based on global question patterns within the datasets, e.g., dataset 122, a user's topic metadata, and the user's IR. The IR may be generated as described with respect to FIG. 2 herein. In order to obtain a high quality paraphrased synthetic NLQ, the one or more paraphrased synthetic NLQs may be filtered. For example, the one or more paraphrased synthetic NLQs may be filtered with respect to fluency using a language model in natural language to filter the less fluent paraphrased synthetic NLQs. For cycle consistency, the paraphrased synthetic NLQs may be filtered based on which paraphrased synthetic NLQs are executable within the NLQ query service 110.

At 1306, based on the paraphrased synthetic NLQs, synthetic NLQs are generated.

At 1308, the synthetic NLQs to the user as examples of types of NLQs that the user may submit. For example, when readers, e.g., user 112, are typing their NLQs into a search bar, related synthetic NLQs may be provided to the readers based on fuzzy matching or a semantic search. In particular, the IR may be generated from the user metadata and the IR may be translated into the synthetic NLQ.

At 1310, an actual NLQ is received from the user. For example, based on the related synthetic NLQs, the user 112 may enter an actual NLQ. The actual NLQ may be similar to or the same as one of the related synthetic NLQs.

Figure 14:
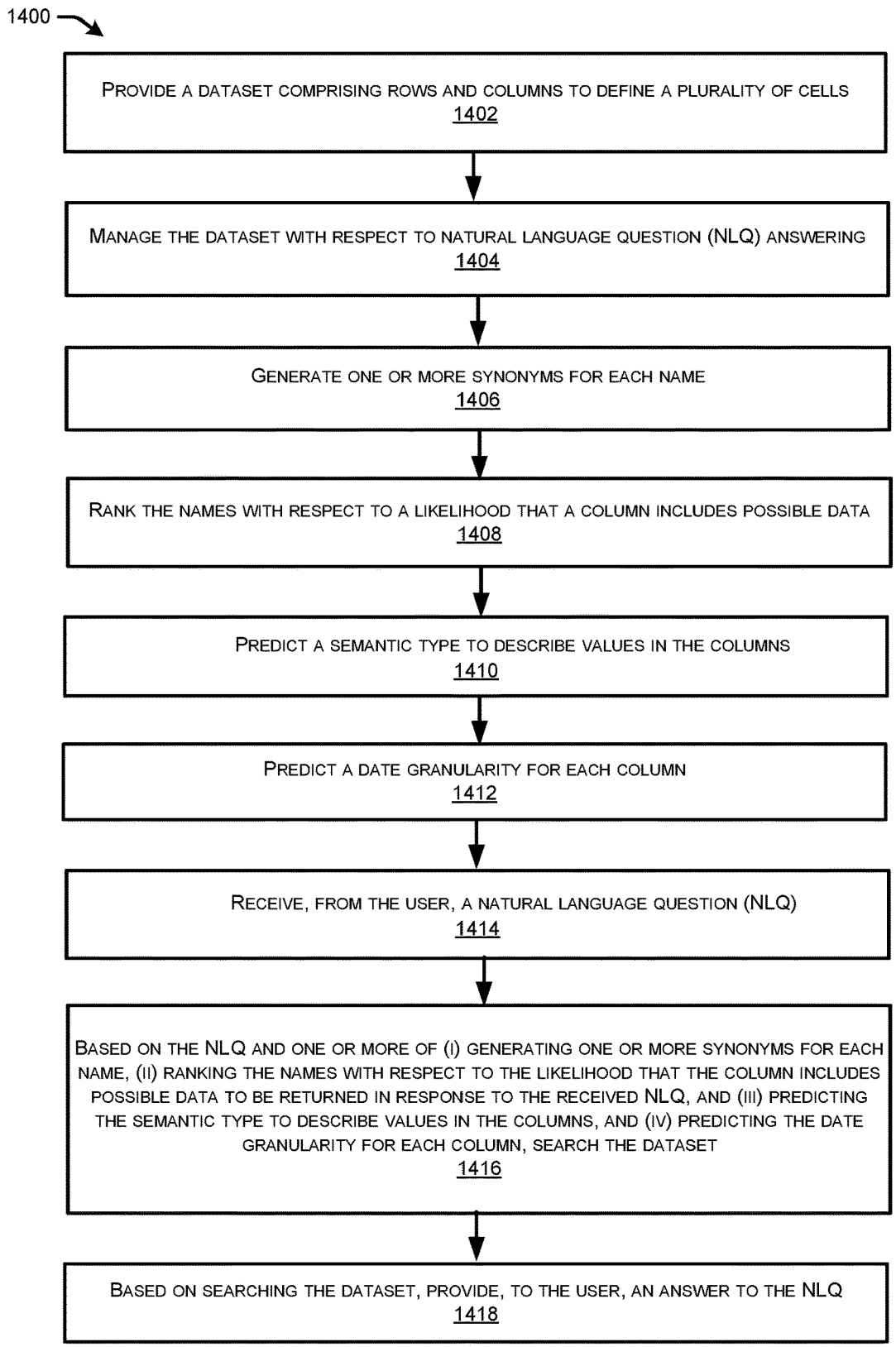
FIG. 14 is a flow diagram of an example method for enriching dataset metadata.

FIG. 14 illustrates a flow diagram of an example method 1400 for managing enriching dataset metadata with business semantics for natural language answering of NLQs, e.g., NLQ, 124 with respect to a dataset, e.g., dataset 122.

At 1402, a dataset arranged in tabular form comprising rows and columns is provided, where each column has a name. For example, the dataset may be similar to the dataset illustrated in Table 1.

At 1404, the dataset is managed with respect to natural language question (NLQ) answering, where managing the dataset comprises:

At, 1406, generating one or more synonyms for each name. For example, generating one or more synonyms for columns of dataset 122 determining a target phrase. The target phrase is used to generate candidate synonyms. For example, a knowledge graph (e.g., using ConceptNet) may be traversed for a target phrase, such as "Patient", to generate candidate synonyms. A domain specific phrase may be generated to generate a prompt for a large language model to fill in. For example, using "Patient" the phrase generated might be "In the context of healthcare, Patient is <candidate>". The hydrated phrase may be ranked via an ensemble of similarity models. In particular, a candidate list of synonyms for each phrase is generated. The synonyms are generally domain-relevant synonyms (aka aliases) for column names and cell values. In order to increase variability (i.e., recall), two approaches may be employed: graph-based and model-based. As an example, consider a domain entitled "Healthcare." For the graph-based approach, synonyms from one or more public knowledge graph sources may be directly collected. For a model-based approach, a text generation model may be used to curate synonym candidates for a target phrase (which may be performed using a ML model 116 of NLQ query search service 110 or a ML model 120 of data model service 118). For each target phrase, a context sentence may be generated (with the phrase-to-be-replaced identified by some textual marker, e.g., single quotes.) A general pretrained encoder-decoder model may be fine-tuned to specifically replace the identified phrase with an alternate phrase and collect that candidate noted by the same textual marker in the output. The candidate synonyms may be filtered using one of ML models 116 or 120 to include only those candidate synonyms that are most semantically relevant to the original target phrase. As may be seen in the examples printed above, there is a significant amount of noise in the samples collected/generated for a given target phrase. For example, lack of domain specificity in the public global knowledge graph (i.e., "service area" to "service surface area") and over-specificity for model generated candidates (i.e., "health service area" to "US state service area"). In order to overcome this, a context sentence may be generated with the candidate_phrase, which may be compared against a context sentence generated with the target_phrase to determine if the candidate phrase is indeed a valid substitution. As previously noted, a general pretrained encoder-decoder model may be fine-tuned to specifically replace the identified phrase with an alternate phrase and collect that candidate noted by the same textual marker in the output. The "context" may be provided by including the relevant domain for the target phrase, as well as a sample "cell value" associated with the target phrase in the original schema, e.g., dataset 122

At 1408, ranking, using a Learn-To-Rank machine learning model, the names with respect to a likelihood that a column includes possible data to be returned to a user in response to a received NLQ from the user. For example, interesting fields may be provided to users, e.g., user 112, so that they may spend extra attention when annotating or reviewing associated metadata predictions. The intention is that by guiding authors to focus on fields (columns) that are most likely to appear in user NLQs, initial reader success after onboarding will be boosted. In configurations for a dataset, e.g., dataset 122 illustrated in Table 1, each field therein may be assigned an interesting score [0.0,1.0], which represents a normalized frequency of that field's usage across NLQs provided for that data source. In configurations, normalization may be scoped to a per dataset level (i.e., ten columns appear in NLQs for a given data set, column Y appears in two of those, therefore column Y is assigned a score of 0.2). In configurations, an extractive question and answer (QA) architecture with a custom loss function may be used in order to model Learn-to-Rank behavior across columns within the dataset to rank them according to a level of interest. The goal of an extractive QA is to predict the start/end span of some text with a larger "context" paragraph, which best represents the answer to the question. For this task the entire dataset schema is provided as "context" and the extractive QA architecture model, e.g., one of ML models 116 or 120, may be trained to predict the start span of the most interesting field name within that context. The question portion is implied and excluded from input.

At 1410, predicting a semantic type to describe values in the columns. For example, an algorithm leverages a set of heuristics and a pre-trained NER model (e.g., NER and RE model 208) to detect semantic types for columns. The detection algorithm takes as input a dataset ID d, then outputs predicted semantic types for each column on a best-effort basis. Sometimes the algorithm may not be able to detect the semantic type of a column due to lack of strong evidence or conflicting signals given by row values and metadata. An assumption of the algorithm is that a column should have a type that is defined by the NQL query service 110 (referred to herein as QS type). Except for a few QS types such as "Country" and "Date", the semantic types' corresponding to QS types are either string or integer. For those columns with QS types that are already semantic types (e.g., "Country", "City", "Date"), the algorithm will not predict semantic types. The algorithm detects string and integer columns separately where string columns' semantic types are detected first. It is because the existence of some semantic types may provide context for integer columns' semantic type detection. For example, if there is a "person" column, then the integer column with values ranging from 1 to 100 may be of semantic type "Age".

At 1412, predicting a date granularity for each column. For example, an algorithm may be utilized by the NLQ query service 110 to predict date granularity for columns within a dataset. In configurations, the algorithm has a bias for lower granularity, e.g., if a column is predicted to have yearly granularity even though it is a monthly granular, then it is an issue because the NLQ query service 110 may reject this dataset, e.g., data set 122, when a NLQ for monthly data is requested by a user 112. To avoid this issue, the algorithm is thus biased for lower granularity. Additionally, in configurations, the algorithm predicts when high confidence is present. In configurations, the algorithm predicts a column state granularity only when there is more than a 90% confidence with respect to the predicted date granularity.

At 1414, based on the NLQ and one or more of (i) generating one or more synonyms for each name, (ii) ranking the names with respect to the likelihood that the column includes possible data to be returned in response to the received NLQ, (iii) predicting the semantic type to describe values in the columns, and (iv) predicting the date granularity for each column, the dataset is searched.

At 1416, based on searching the dataset, an answer to the NLQ is provided to the user.

Figure 15:
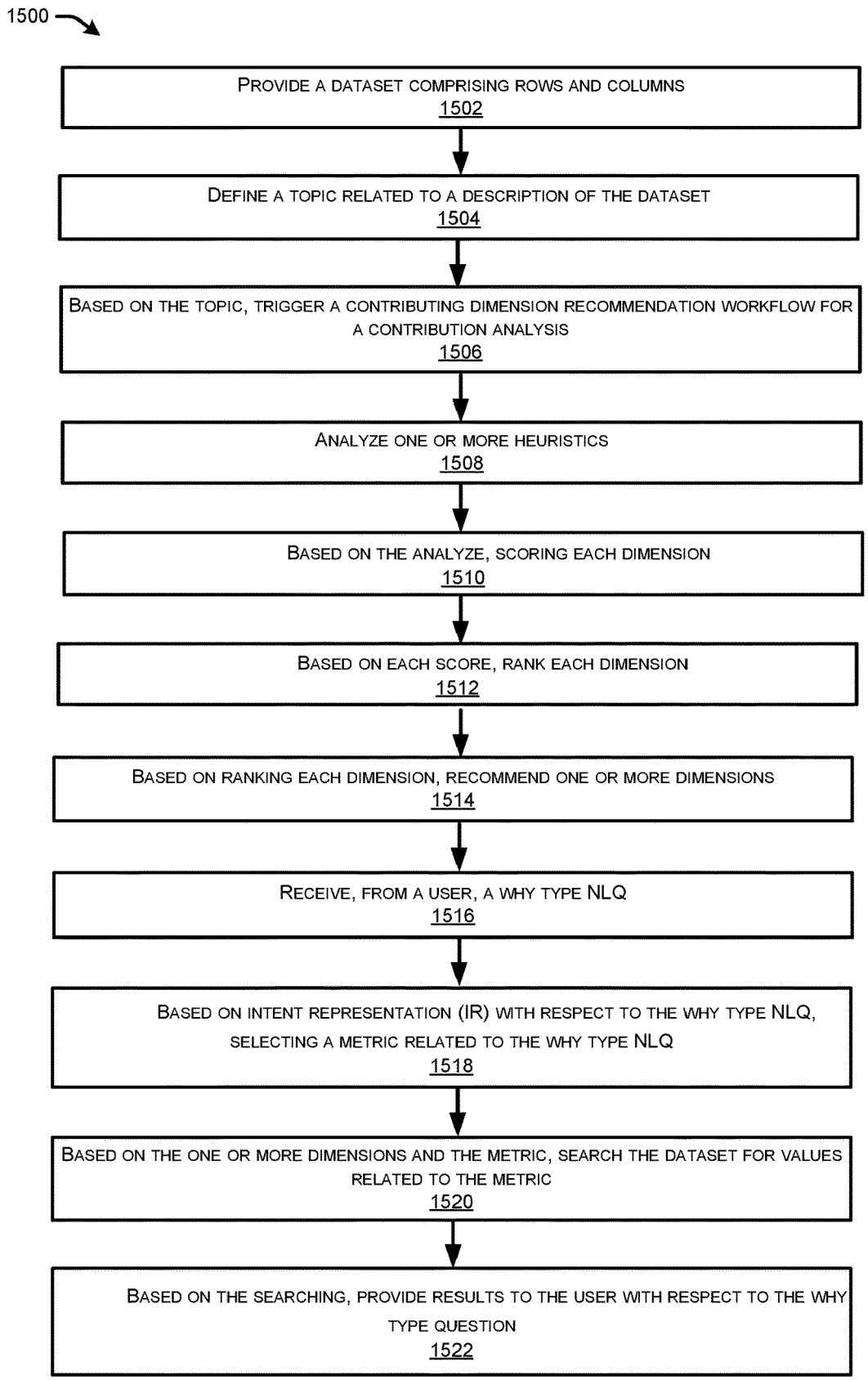
FIG. 15 is a flow diagram of an example method for determining recommended dimensions for contribution analysis and using the recommended dimensions and intent representation (IR) to answer why type NLQs.

FIG. 15 is a flow diagram of an example method 1500 for determining recommended dimensions for contribution analysis and using the recommended dimensions and IR to answer why type NLQs.

At 1502, a dataset is provided where the dataset is arranged in tabular form comprising rows and columns, wherein each column has a name representing a dimension. For example, the dataset may be similar to the dataset illustrated in Table 1.

At 1504, a topic related to a description of the dataset is defined. For example, a topic generally comprises one or more datasets, which in configurations, may be a maximum of twenty datasets, e.g., dataset 122. A topic generally relates to various insights and areas within the datasets. The insights and information related to the topic are generally portrayed to the authors and readers in the form of dashboards, reports, graphs, etc.

At 1506, based on the topic, a contributing dimension recommendation workflow for a contribution analysis is triggered, wherein the dimension recommendation workflow comprises steps 1508-1514.

At 1508, a separate application programming interface (API) analyzes one or more heuristics comprising scanning visuals displayed to user related to the dataset, scanning previously asked questions, computing entropy of a distribution of values for the dimensions of the dataset, previously run anomaly detections, co-occurrence between measures and dimensions using logistic regression, and frequency of use of the dimensions in previous contribution analyses. For example, the contribution dimensions may be determined as a separate API. The separate API takes a topic/dataset as an input and returns a structure that may contain recommended dimensions along with a numerical score that indicates how likely they are to become good contributors, when used in CA as a response to a "why" question.

As previously noted, example heuristics may include:

Scan QS visuals—Scan all QS visuals for a given dataset, get the dimensions used for filters and groupby's and rank them by frequency of usage (potentially different weights for filters vs groupby's). Can be used not only for getting popular dimensions, but also measures. This will rank contributors.

Scan QS questions—It would do the same as "Scan QS visuals", getting the data from IRs instead of visuals. This will rank contributors.

Entropy—Compute entropy of distribution of values for dimensions of a dataset. It's not normalized, but, intuitively, it will have value 0 if there is only one value for all rows of a given column, and it will increase along with increased variety, reaching the maximum value when every row has a different value for a given column (think IDs). The edge values will not be interesting to us, ideally, we would get middle values. This will remove worst contributors and rank contributors.

Anomaly detection based on user's runs—whenever a customer runs an anomaly detection, take the anomalies, run contributions analysis on them for all dimensions, and save the best contributors. This will rank contributors.

Anomaly detection—As above, but instead of depending on the user running anomaly detection, we can run it during topic creation. This will rank contributor.

Co-occurrence—Compute co-occurrence between measures and dimensions using logistic regression (or similar). Remove the ones with the highest or zero co-occurrence. Use the scores to rank others. This will remove worst contributors and rank contributors.

CA usage data—Start reporting what dimensions were used for CA (ideally, with some score based on the variety of contributors). Use the frequency and score to recommend the dimensions in the future. This ranks contributors.

Domain—Get dimensions for a given dataset from knowledge graphs, e.g., built on top of Nautilus datasets. This ranks contributors.

At 1510, based on the analyzing, each dimension is scored. For example, the separate API takes a topic/dataset as an input and returns a structure that may contain recommended dimensions along with a numerical score that indicates how likely they are to become good contributors, when used in CA as a response to a "why" question.

At 1512, based on each score, each dimension is ranked. As previously noted, analysis of the heuristics results in ranking of dimensions.

At 1514, based on ranking each dimension, one or more dimensions is recommended for use in answering why type natural language questions (NLQs). For example, the separate API takes a topic/dataset as an input and returns a structure that may contain recommended dimensions along with a numerical score that indicates how likely they are to become good contributors, when used in CA as a response to a "why" question.

At 1516, a why type NLQ is received from a user.

At 1518, based on intent representation (IR) with respect to the why type NLQ, a metric related to the why type NLQ is selected. For example, contribution analysis uses IR. The ML IR 224 of the model pipeline 200 may be used to determine IR. A top level field with key "contribution Analysis" may be added. The presence of this key with a non-empty value indicates the IR is a contribution analysis IR. The contribution Analysis field may contain predicted contributing factors, directionality indicator, sort type. The time range may be indicated using a regular date filter in the existing filters field. Table 8 provides example rules the NQL query service 110 should enforce for the ML IR 224. At inference time, each of the pieces of data are provided to the frontend of the model pipeline 200, so that it can call contribution analysis, in order to produce the Why visual. The backend workflow for answering the question will remain the same as it is today, except that Why questions will have their own set of postprocessing steps. If NQL query service 110 predicts a contribution analysis IR then the inputs to contribution analysis are provided where the metrics are the metrics from the IR in the metrics field. There should be exactly one metric, and it must have an aggregation that is sum, average, or count, since only those are supported by contribution analysis.

At 1520, based on the one or more dimensions and the metric, the dataset is searched for values related to the metric.

At 1522, based on the searching, results are provided to the user with respect to the why-type question. For example, why type NLQs use the contribution analysis to do the computations for determining factors contributing to the change of a metric value. The input to the contribution analysis primarily consists of the metric whose change is of most interest. The allowed aggregations on that metric are SUM, AVERAGE, or COUNT. The queries run for contribution analysis are run per dimension. The contribution analysis code compares value of the metric (with respect to the given dimensions) in the start time to the value at the end time. It is aggregated across those time periods. Thus, if the metric is sum (sales) and the end time range is the month of March, then the metric value contribution analysis will consider is the sum of sales for all of March. The ranges are given as expressions that act as row-level predicates, evaluating to true when a row is in the time range and false when it is not.

Accordingly, the techniques and architecture described herein provide a BI service that includes a NLQ feature or service within a service provider network. The BI service enriches dataset metadata with business semantics in order to improve NLQ answering. The dataset metadata may be enriched utilizing one or more of column synonym generation, interesting field ranking on unseen schemas, column time granularity prediction, and semantic type inference. The techniques and architecture also provide row level security for autocomplete during entry of NLQs and fuzzy matching in natural language question answering. The techniques and architecture additionally provide automated contribution analysis for "why question" style NLQ answering. Furthermore, the techniques and architecture provide synthetic question generation for novel insights and teaching natural language question formulation and entry. These various techniques and architecture allow for more accurate answering of NLQs, which can result in fewer errors when using NLQs to search datasets, thereby reducing processing time. The techniques and architecture also provide additional security, which can result in the use of less computing resources to correct errors.

Figure 16:
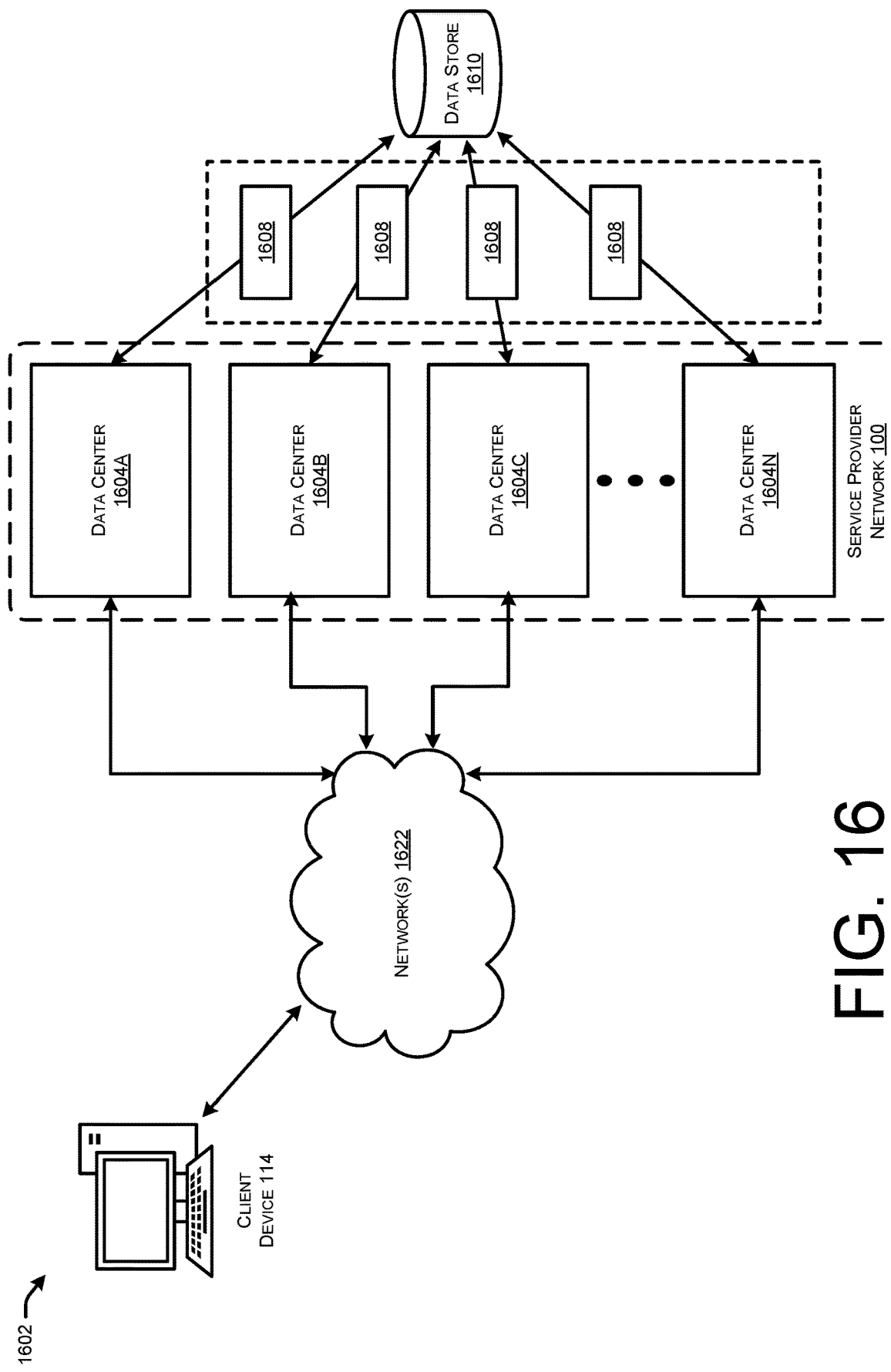
FIG. 16 is a system and network diagram that shows an illustrative operating environment that includes a service provider network that can be configured to implement aspects of the functionality described herein.

FIG. 16 is a system and network diagram that shows one illustrative operating environment 1602 for the configurations disclosed herein that includes a service provider network 100 that can be configured to perform the techniques disclosed herein and which may be accessed by a computing device, e.g., client device 114. The service provider network 100 can provide computing resources, like VM instances and storage, on a permanent or an as-needed basis. Among other types of functionalities, the computing resources provided by the service provider network 100 may be utilized to implement the various services described above such as, for example, the BI service 108.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 1604A-1604N (which might be referred to herein singularly as "a data center 1604" or in the plural as "the data centers 1604"). The data centers 1604 are facilities utilized to house and operate computer systems and associated components. The data centers 1604 typically include redundant and backup power, communications, cooling, and security systems. The data centers 1604 can also be located in geographically disparate locations. One illustrative embodiment for a data center 1604 that can be utilized to implement the technologies disclosed herein will be described below with regard to FIG. 16.

The data centers 1604 may be configured in different arrangements depending on the service provider network 100. For example, one or more data centers 1604 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 1622, which can be a wide area communication network ("WAN"), such as the Internet, an intranet or an Internet service provider ("ISP") network or a combination of such networks. For example, and without limitation, a computing device, e.g., computing device 1602, operated by a user of the service provider network 100 may be utilized to access the service provider network 100 by way of the network(s) 1622. It should be appreciated that a local-area network ("LAN"), the Internet, or any other networking topology known in the art that connects the data centers 1604 to remote customers and other users can be utilized. It should also be appreciated that combinations of such networks can also be utilized.

Each of the data centers 1604 may include computing devices that include software, such as applications that receive and transmit data 1608. For instance, the computing devices included in the data centers 1604 may include software components which transmit, retrieve, receive, or otherwise provide or obtain the data 1608 from a data store 1610. For example, the data centers 1604 may include or store the data store 1610, which may include the data 1608.

Figure 17:
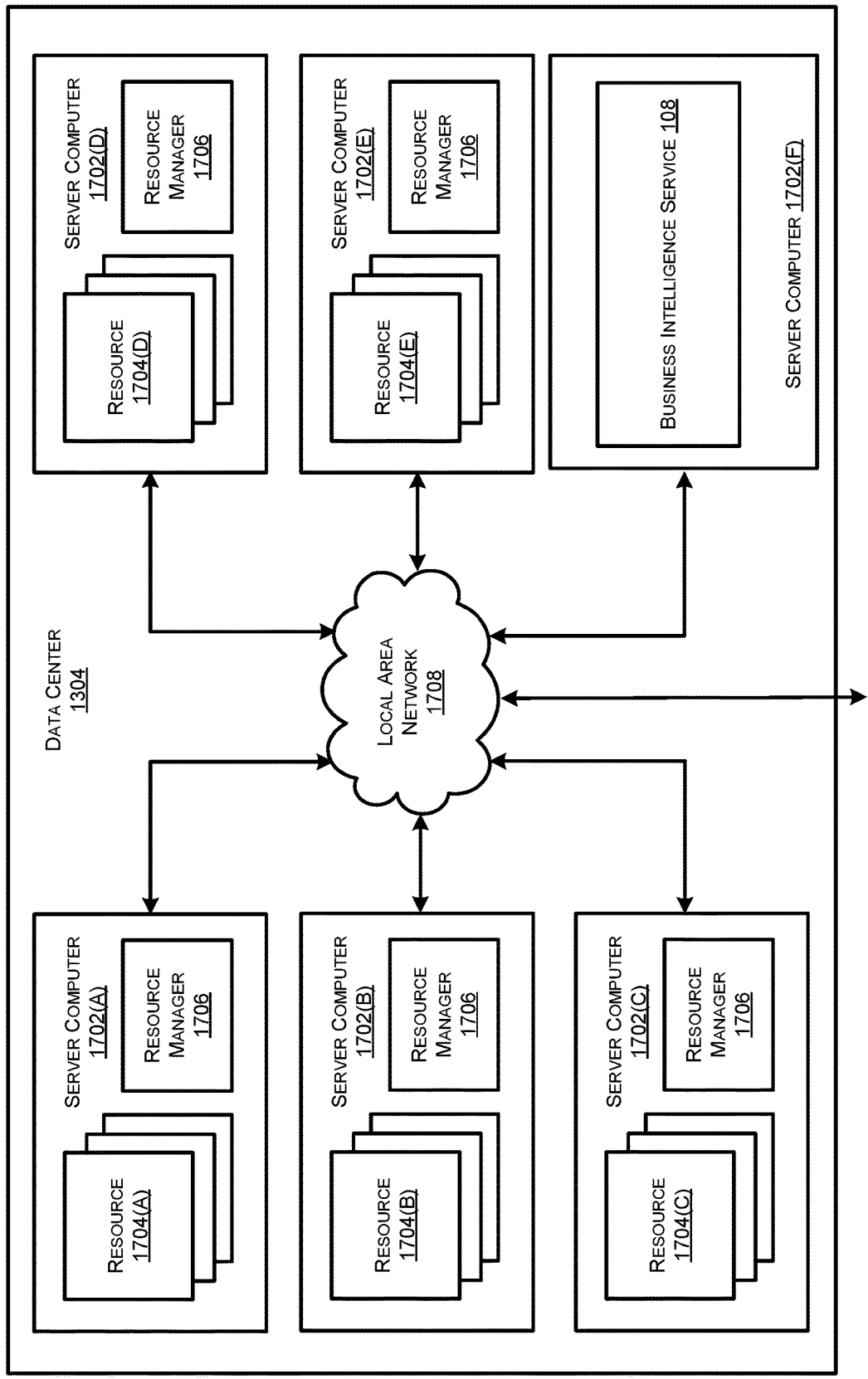
FIG. 17 is a computing system diagram illustrating a configuration for a data center that can be utilized to implement aspects of the technologies disclosed herein.

FIG. 17 is a computing system diagram that illustrates one configuration for a data center 1704 that implements aspects of the technologies disclosed herein. The example data center 1704 shown in FIG. 17 includes several server computers 1702A-1702F (which might be referred to herein singularly as "a server computer 1702" or in the plural as "the server computers 1702") for providing computing resources 1704A-1704E.

The server computers 1702 can be standard tower, rack-mount, or blade server computers configured appropriately for providing the computing resources described herein (illustrated in FIG. 17 as the computing resources 1704A-1704E). As mentioned above, the computing resources provided by the service provider network 100 can be data processing resources such as VM instances or hardware computing systems, database clusters, computing clusters, storage clusters, data storage resources, database resources, networking resources, and others. Some of the servers 1702 can also be configured to execute a resource manager 1706 capable of instantiating and/or managing the computing resources. In the case of VM instances, for example, the resource manager 1706 can be a hypervisor or another type of program configured to enable the execution of multiple VM instances on a single server computer 1702. Server computers 1702 in the data center 1704 can also be configured to provide network services and other types of services.

The data center 1704 shown in FIG. 17 also includes a server computer 1702F that can execute some or all of the software components described above. For example, and without limitation, the server computer 1702F can be configured to execute components of the service provider network 100, including the BI service 108, and/or the other software components described above. The server computer 1702F can also be configured to execute other components and/or to store data for providing some or all of the functionality described herein. In this regard, it should be appreciated that the services illustrated in FIG. 17 as executing on the server computer 1702F can execute on many other physical or virtual servers in the data centers 1704 in various embodiments.

In the example data center 1704 shown in FIG. 17, an appropriate LAN 1708 is also utilized to interconnect the server computers 1702A-1702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1704A-1704N, between each of the server computers 1702A-1702F in each data center 1704, and, potentially, between computing resources in each of the server computers 1702. It should be appreciated that the configuration of the data center 1704 described with reference to FIG. 17 is merely illustrative and that other implementations can be utilized.

Figure 18:
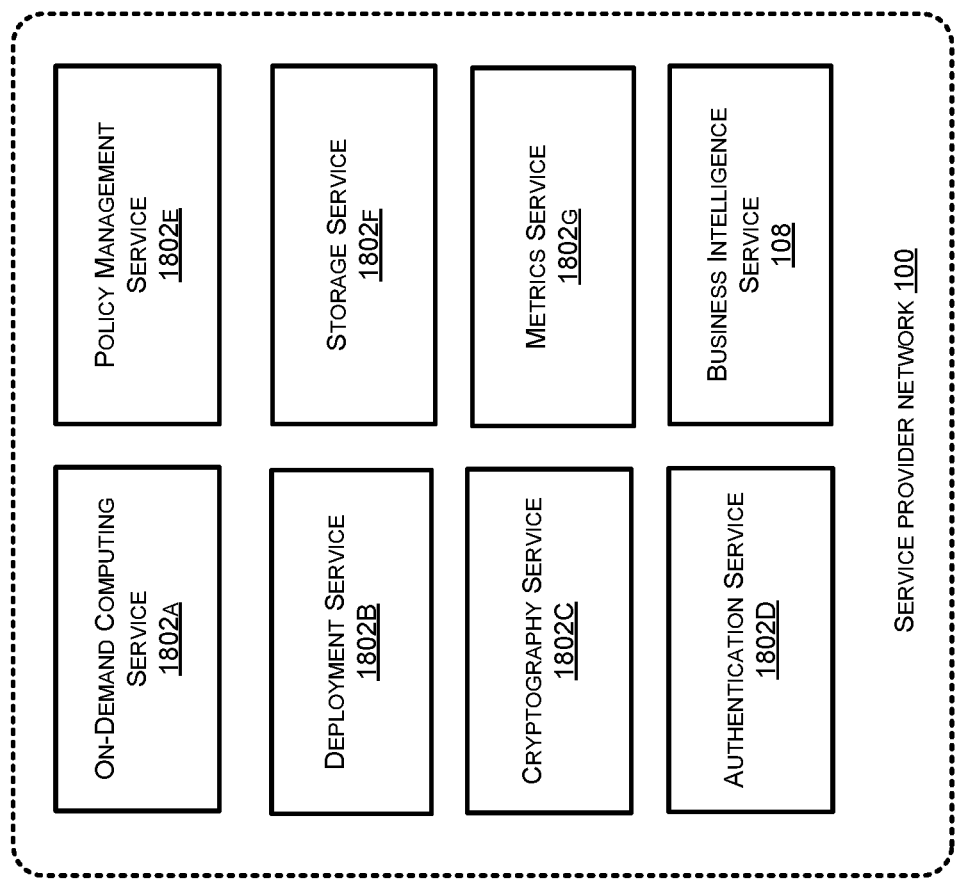
FIG. 18 is a network services diagram that shows aspects of several services that can be provided by and utilized within a system, or a larger system of which the system is a part, which is configured to implement the various technologies disclosed herein.

FIG. 18 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the business intelligence service 108. The service provider network 100 can also provide other types of services including, but not limited to, an on-demand computing service 1802A, a deployment service 1802B, a cryptography service 1802C, a storage service 1802D, an authentication service 1802E, and/or a policy management service 1802G, some of which are described in greater detail below. Additionally, the service-provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 1822 shown in FIG. 18. Communications from a user computing device, such as the computing device 1802 shown in FIG. 18, to the service provider network 100 can cause the services provided by the service provider network 100 to operate in accordance with the described configurations or variations thereof.

It is noted that not all embodiments described include the services described with reference to FIG. 18 and that additional services can be provided in addition to or as an alternative to services explicitly described. Each of the services shown in FIG. 18 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 1802A to store data in or retrieve data from a storage service). Additional details regarding some of the services shown in FIG. 18 will now be provided.

As discussed above, the on-demand computing service 1802A (can be a collection of computing resources configured to instantiate VM instances and to provide other types of computing resources on demand. For example, a customer or other user of the service provider network 100 can interact with the on-demand computing service 1802A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 1802A is shown in FIG. 18, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 1802C. The cryptography service 1802C can utilize storage services of the service provider network 100 to store encryption keys in encrypted form, whereby the keys are usable to decrypt customer keys accessible only to particular devices of the cryptography service 1802C. The cryptography service 1802C can also provide other types of functionality not specifically mentioned herein.

As illustrated in FIG. 18, the service provider network 100, in various embodiments, also includes an authentication service 1802D and a policy management service 1802E. The authentication service 1802D, in one example, is a computer system (i.e., collection of computing resources) configured to perform operations involved in authentication of users. For instance, one of the services 1802 shown in FIG. 18 can provide information from a user to the authentication service 1802D to receive information in return that indicates whether or not the requests submitted by the user are authentic.

The policy management service 1802E, in one example, is a network service configured to manage policies on behalf of customers or internal users of the service provider network 100. The policy management service 1802E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 1802 based, at least in part, on the needs of its customers. For instance, the service provider network 100 can maintain a deployment service 1802B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 19:
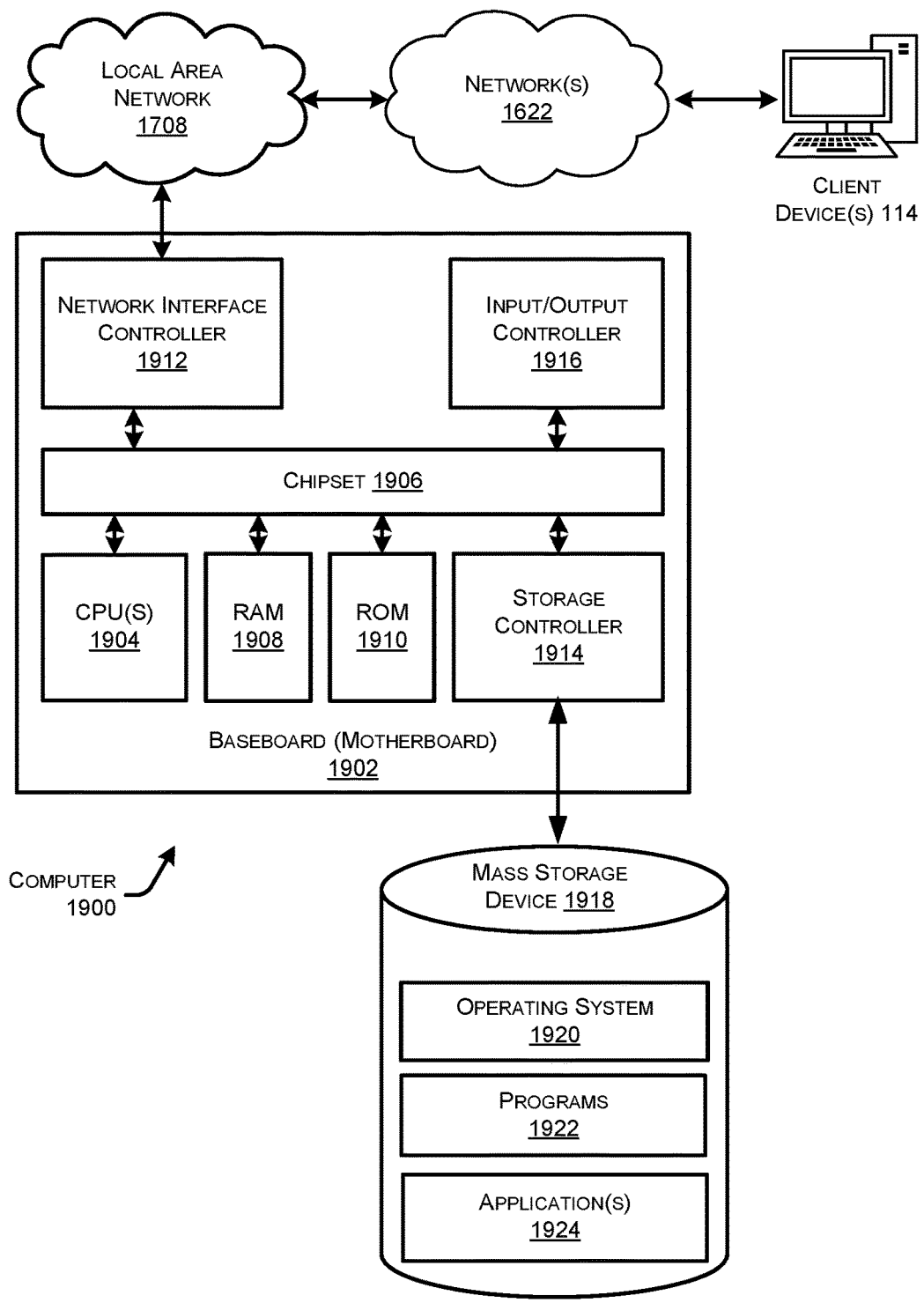
FIG. 19 is a computer architecture diagram showing an illustrative computer hardware architecture for implementing a computing device that can be utilized to implement aspects of the various technologies presented herein.

FIG. 19 shows an example computer architecture for a computer 1900 capable of executing program components for implementing the functionality described above. The computer architecture shown in FIG. 19 illustrates a server computer, workstation, desktop computer, laptop, tablet, network appliance, e-reader, smartphone, or other computing device, and can be utilized to execute any of the software components presented herein.

The computer 1900 includes a baseboard 1902, or "motherboard," which is a printed circuit board to which a multitude of components or devices can be connected by way of a system bus or other electrical communication paths. In one illustrative configuration, one or more central processing units ("CPUs") 1904 operate in conjunction with a chipset 1906. The CPUs 1904 can be standard programmable processors that perform arithmetic and logical operations necessary for the operation of the computer 1900.

The CPUs 1904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1906 provides an interface between the CPUs 1904 and the remainder of the components and devices on the baseboard 1902. The chipset 1906 can provide an interface to a RAM 1908, used as the main memory in the computer 1900. The chipset 1906 can further provide an interface to a computer-readable storage medium such as a read-only memory ("ROM") 1910 or non-volatile RAM ("NVRAM") for storing basic routines that help to startup the computer 1900 and to transfer information between the various components and devices. The ROM 1910 or NVRAM can also store other software components necessary for the operation of the computer 1900 in accordance with the configurations described herein.

The computer 1900 can operate in a networked environment using logical connections to remote computing devices 1902 and computer systems through a network, such as the network 1908. The chipset 1906 can include functionality for providing network connectivity through a Network Interface Controller (NIC) 1912, such as a gigabit Ethernet adapter. The NIC 1912 is capable of connecting the computer 1900 to other computing devices 602 over the network 1708 (or 1622). It should be appreciated that multiple NICs 1912 can be present in the computer 1900, connecting the computer to other types of networks and remote computer systems.

The computer 1900 can be connected to a mass storage device 1918 that provides non-volatile storage for the computer. The mass storage device 1918 can store an operating system 1920, programs 1922 (e.g., agents, etc.), data, and/or applications(s) 1924, which have been described in greater detail herein. The mass storage device 1918 can be connected to the computer 1900 through a storage controller 1914 connected to the chipset 1906. The mass storage device 1918 can consist of one or more physical storage units. The storage controller 1914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1900 can store data on the mass storage device 1918 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1918 is characterized as primary or secondary storage, and the like.

For example, the computer 1900 can store information to the mass storage device 1918 by issuing instructions through the storage controller 1914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1900 can further read information from the mass storage device 1918 by detecting the physical states or characteristics of one or more particular locations within the physical storage units.

In addition to the mass storage device 1918 described above, the computer 1900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1900. In some examples, the operations performed by the service provider network 100, and or any components included therein, may be supported by one or more devices similar to computer 1900. Stated otherwise, some or all of the operations performed by the service provider network 100, and or any components included therein, may be performed by one or more computer devices 1900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1918 can store an operating system 1920 utilized to control the operation of the computer 1900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1918 can store other system or application programs and data utilized by the computer 1900.

In one embodiment, the mass storage device 1918 or other computer-readable storage media is encoded with computer-executable instructions which, when loaded into the computer 1900, transform the computer from a general-purpose computing system into a special-purpose computer capable of implementing the embodiments described herein. These computer-executable instructions transform the computer 1900 by specifying how the CPUs 1904 transition between states, as described above. According to one embodiment, the computer 1900 has access to computer-readable storage media storing computer-executable instructions which, when executed by the computer 1900, perform the various processes described above with regard to FIGS. 1-15. The computer 1900 can also include computer-readable storage media having instructions stored thereupon for performing any of the other computer-implemented operations described herein.

The computer 1900 can also include one or more input/output controllers 1916 for receiving and processing input from a number of input devices, such as a keyboard, a mouse, a touchpad, a touch screen, an electronic stylus, or other type of input device. Similarly, an input/output controller 1916 can provide output to a display, such as a computer monitor, a flat-panel display, a digital projector, a printer, or other type of output device. It will be appreciated that the computer 1900 might not include all of the components shown in FIG. 19, can include other components that are not explicitly shown in FIG. 19, or might utilize an architecture completely different than that shown in FIG. 19.

The computer 1900 may transmit, receive, retrieve, or otherwise provide and/or obtain data and/or results to and/or from the service provider network 100. The computer 1900 may store the data on the operating system 1920, and/or the programs 1922 that are stored in the mass storage device 1918 to update or otherwise modify the operating system 1920 and/or the programs 1922.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
    providing a dataset arranged in tabular form comprising rows and columns, wherein each column has a name to thereby provide a plurality of names;
    managing the dataset with respect to natural language question (NLQ) answering in response to NLQs submitted by users via user devices, wherein managing the dataset comprises:
        generating one or more domain-relevant synonyms for each name of the plurality of names;
        identifying a candidate phrase from the domain-relevant synonyms;
        generating a first context sentence associated with the candidate phrase;
        comparing the first context sentence with a second context sentence of a target phrase of the plurality of names to determine whether the candidate phrase is a valid substitution for the target phrase;
        removing the candidate phrase from the domain-relevant synonyms based on the candidate phrase being a valid substitution for the target phrase;
        ranking, using a Learn-To-Rank machine learning model, the names within the plurality of names with respect to a likelihood that a column includes possible data to be returned to a user via a user device in response to a received NLQ from the user via the user device, wherein the Learn-To-Rank machine learning model is configured to use an input schema to produce a ranking for each column in the dataset with respect to other columns in the dataset;
        predicting a date granularity for each column, wherein the date granularity predicts whether dates in a given column are in regular intervals; and
        predicting a semantic type to describe values in the columns;
    receiving, from the user via the user device, a NLQ;
    based on the NLQ and two or more of (i) generating one or more synonyms for each name, (ii) ranking the names with respect to the likelihood that the column includes the possible data to be returned in response to the received NLQ, (iii) predicting the semantic type to describe values in the columns, and (iv) predicting the date granularity for each column, searching the dataset; and
    based on searching the dataset, providing, to the user via the user device, an answer to the NLQ.

2. The computer-implemented method of claim 1, wherein generating one or more synonyms for each name comprises:
    prompting, with a prompt directed to a target phrase related to a particular name, a language model to fill in the prompt;
    receiving, from the language model, a plurality of responses for filling in the prompt; and
    ranking, by the language model, the plurality of responses.

3. The computer-implemented method of claim 1, wherein ranking the names with respect to the likelihood that the column includes the possible data to be returned in response to the received NLQ comprises:
    inputting the dataset into a machine learning (ML) model;
    inputting, when available, a usage signal into the ML model;
    assigning, by the ML model, a score to each column representing a frequency in which a particular column appears in responses to NLQs; and
    based on the scores, ranking each column in the dataset.

4. The computer-implemented method of claim 1, wherein predicting a date granularity for each column comprises:
    sampling multiple groups of unique dates from the dataset;
    based on sampling the multiple groups of the unique dates from the dataset, assigning samples of the unique dates into one of a plurality of buckets of dates that occur on granularity boundaries;
    based on the plurality of buckets, predicting period granularity for each column; and
    storing the period granularity for each column.

5. The computer-implemented method of claim 1, wherein predicting the semantic type to describe the values in the columns comprises:
    defining a list of semantic types;
    applying, by a machine learning (ML) model to columns that currently lack a semantic type, a plurality of rules in a predefined order; and
    based on applying the plurality of rules in the predefined order, predicting, using the ML model, the semantic type to describe values in each column.

6. A computer-implemented method comprising:
    providing a dataset arranged in tabular form comprising rows and columns, wherein individual columns of the columns have a name to thereby provide a plurality of names;

generating one or more domain-relevant synonyms for each name of the plurality of names;
identifying a candidate phrase from the domain-relevant synonyms;
generating a first context sentence associated with the candidate phrase;
removing the candidate phrase from the domain-relevant synonyms based on a result of comparing the first context sentence with a second context sentence of a target phrase of the plurality of names to determine whether the candidate phrase is a valid substitution for the target phrase;
ranking, using a Learn-To-Rank machine learning model, names within the plurality of names with respect to a likelihood that a column includes possible data to be returned to a user via a user device in response to a received NLO from the user via the user device, wherein the Learn-To-Rank machine learning model is configured to use an input schema to produce a ranking for individual columns in the dataset with respect to other columns in the dataset;
predicting a date granularity for the individual columns, wherein the date granularity predicts whether dates in a given column are in regular intervals;
receiving, from a user via the user device, a NLQ;
based, at least in part on, the NLQ and two or more of (i) ranking the names with respect to the likelihood that a column includes possible data to be returned in response to a received NLQ, (ii) predicting a semantic type to describe values in the columns, searching the dataset, (iii) predicting the date granularity for the individual columns, searching the dataset; and
based at least in part on searching the dataset, providing, to the user via the user device, an answer to the NLQ.

7. The computer-implemented method of claim 6, wherein searching the dataset is based at least in part on generating one or more synonyms for each name and wherein generating the one or more synonyms for each name comprises:
  prompting, with a prompt directed to a target phrase related to a particular name, a language model to fill in the prompt;
  receiving, from the language model, a plurality of responses for filling in the prompt; and
  ranking, by the language model, the plurality of responses.

8. The computer-implemented method of claim 7, wherein searching the dataset is based at least in part on generating one or more synonyms for each name and wherein generating the one or more synonyms for each name comprises:
  generating, by a machine learning (ML) model, a first context sentence that includes the candidate phrase;
  generating, by the ML model, a second context sentence that includes, a target phrase; and
  comparing, by the ML model, the first context sentence with the second context sentence.

9. The computer-implemented method of claim 6, wherein searching the dataset is based at least in part on generating one or more synonyms for each name and wherein generating the one or more synonyms for each name comprises:
  traversing a knowledge graph for the name;
  collecting one or more possible synonyms from the knowledge graph; and
  ranking, using a language model, the one or more possible synonyms.

10. The computer-implemented method of claim 6, wherein searching the dataset is based at least in part on ranking the names with respect to the likelihood that the column includes the possible data to be returned in response to the received NLQ, and wherein ranking the names with respect to the likelihood that the column includes the possible data to be returned m response to the received NLQ comprises:
  ranking the names using a question and answer (QA) extractive model.

11. The computer-implemented method of claim 6, wherein searching the dataset is based at least in part on predicting the date granularity for the individual columns, and wherein predicting the date granularity for the individual columns comprises:
  retrieving, by a machine learning (ML) model, batches of data cells each having a day value;
  creating bucket lists;
  determining date differences between each pair of data cells having two adjacent day values; and
  based at least in part on the date differences, predicting the date granularity for the individual columns.

12. The computer-implemented method of claim 6, wherein searching the dataset is based at least in part on predicting the semantic type to describe values in the columns, and wherein predicting the semantic type to describe values in the columns comprises, for each column:
  determining if a column has a determined semantic type; and
  based at least in part on the column lacking a determined semantic, evaluating the column with respect to an ordered set of rules, wherein a last rule in the ordered set of rules is an entity-recognizer rule type.

13. One or more computer-readable media storing computer-executable instructions that, when executed, cause one or more processors to perform operations comprising:
  providing a dataset arranged in tabular form comprising rows and columns, wherein individual columns of the columns have a name to thereby provide a plurality of names;
  generating one or more domain-relevant synonyms for each name of the plurality of names;
  identifying a candidate phrase from the domain-relevant synonyms;
  generating a first context sentence associated with the candidate phrase;
  removing the candidate phrase from the domain-relevant synonyms based on a result of comparing the first context sentence with a second context sentence of a target phrase of the plurality of names to determine whether the candidate phrase is a valid substitution for the target phrase;
  ranking, using a Learn-To-Rank machine learning model, names within the plurality of names with respect to a likelihood that a column includes possible data to be returned to a user via a user device in response to a received NLO from the user via the user device, wherein the Learn-To-Rank machine learning model is configured to use an input schema to produce a ranking for individual columns in the dataset with respect to other columns in the dataset;
  predicting a date granularity for the individual columns, wherein the date granularity predicts whether dates in a given column are in regular intervals;
  receiving, from a user via the user device, a NLQ;
  based, at least in part on, the NLQ and two or more of (i) ranking the names with respect to the likelihood that a column includes possible data to be returned in response to a received NLQ, (ii) predicting a semantic type to describe values in the columns, and (iii) predicting the date granularity for the individual columns, searching the dataset; and based at least in part on searching the dataset, providing, to the user via the user device, an answer to the NLQ.

14. The one or more computer-readable media of claim 13, wherein searching the dataset is based at least in part on generating one or more synonyms for each name and wherein generating the one or more synonyms for each name comprises:

prompting, with a prompt directed to a target phrase related to a particular name, a language model to fill in the prompt;

receiving, from the language model, a plurality of responses for filling in the prompt; and ranking, by the language model, the plurality of responses.

15. The one or more computer-readable media of claim 14, wherein searching the dataset is based at least in part on generating one or more synonyms for each name and wherein generating the one or more synonyms for each name comprises:

generating, by a machine learning (ML) model, a first context sentence that includes the candidate phrase;

generating, by the ML model, a second context sentence that includes, a target phrase; and comparing, by the ML model, the first context sentence with the second context sentence.

16. The one or more computer-readable media of claim 13, wherein searching the dataset is based at least in part on generating one or more synonyms for each name and generating one or more synonyms for each name comprises:

traversing a knowledge graph for the name;

collecting one or more possible synonyms from the knowledge graph; and ranking, using a language model, the one or more possible synonyms.

17. The one or more computer-readable media of claim 13, wherein searching the dataset is based at least in part on ranking the names with respect to the likelihood that the column includes the possible data to be returned in response to the received NLQ, and wherein ranking the names with respect to the likelihood that the column includes the possible data to be returned in response to the received NLQ comprises:

ranking the names using a question and answer (QA) extractive model.

18. The one or more computer-readable media of claim 13, wherein searching the dataset is based at least in part on predicting the date granularity for the individual columns, and wherein predicting the date granularity for the individual columns comprises:

retrieving, by a machine learning (ML) model, batches of data cells each having a day value;

creating bucket lists;

determining date differences between each pair of data cells having two adjacent day values; and based at least in part on the date differences, predicting the date granularity for the individual columns.

19. The one or more computer-readable media of claim 13 wherein searching the dataset is based at least in part on predicting the semantic type to describe values in the columns, and wherein predicting the semantic type to describe values in the columns comprises, for each column:

determining if a column has a determined semantic type; and based at least in part on the column lacking a determined semantic, evaluating the column with respect to an ordered set of rules, wherein a last rule in the ordered set of rules is an entity-recognizer rule type.

* * * * *